US006623889B2

(12) United States Patent
Morita et al.

(10) Patent No.: US 6,623,889 B2
(45) Date of Patent: Sep. 23, 2003

(54) NONAQUEOUS ELECTROLYTE SECONDARY BATTERY, CARBON MATERIAL FOR NEGATIVE ELECTRODE, AND METHOD FOR MANUFACTURING CARBON MATERIAL FOR NEGATIVE ELECTRODE

(75) Inventors: Tomokazu Morita, Funabashi (JP); Takahisa Ohsaki, Yokohama (JP); Norio Takami, Yokohama (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 166 days.

(21) Appl. No.: 09/739,778

(22) Filed: Dec. 20, 2000

(65) Prior Publication Data

US 2001/0018150 A1 Aug. 30, 2001

(30) Foreign Application Priority Data

Dec. 20, 1999 (JP) .............................. 11-361594
Sep. 29, 2000 (JP) ........................ 2000-300991

(51) Int. Cl.$^7$ ............................................. H01M 10/24
(52) U.S. Cl. ..................................... 429/231.8; 252/502
(58) Field of Search ...................... 429/231.8; 252/502; 423/414

(56) References Cited

U.S. PATENT DOCUMENTS

| | | | | |
|---|---|---|---|---|
| 3,856,574 A | * | 12/1974 | Amagi et al. ................ | 204/294 |
| 5,312,611 A | | 5/1994 | Takami et al. | |
| 5,556,723 A | | 9/1996 | Ohsaki et al. | |
| 5,698,341 A | * | 12/1997 | Tamaki et al. ............... | 423/275 |
| 6,099,990 A | * | 8/2000 | Denton et al. ............ | 423/447.5 |
| 6,335,122 B1 | * | 1/2002 | Yamada et al. .............. | 429/209 |
| 6,337,159 B1 | * | 1/2002 | Peled et al. ............... | 429/231.4 |

FOREIGN PATENT DOCUMENTS

| | | |
|---|---|---|
| JP | 5-28996 | 2/1993 |
| JP | 6-290781 | 10/1994 |
| JP | 9-55204 | 2/1997 |
| JP | 10-40914 | 2/1998 |
| JP | 10-214615 | 8/1998 |

OTHER PUBLICATIONS

Chessick, J. J., and Zettlemoyer, A. C., "Immersional Heats and the Nature of Solid Surfaces", Advan. Catalysis, vol. 6, No. 263 (1959), pp. 263–299.

E. Peled, et al., "Improved Graphite Anode for Lithium–Ion Batteries, Chemicaly Bonded Solid Electrolyte Interface and Nanochannel Formation", J. Electrochem. Soc., vol. 143, No. 1, Jan. 1996, pp. L4–L7.

C. Menachem, et al., "Characterization of lithiated natural graphite before and after mild oxidation", Journal of Power Sources 76, 1998, pp. 180–185.

* cited by examiner

*Primary Examiner*—Randy Gulakowski
*Assistant Examiner*—Monique Wills
(74) *Attorney, Agent, or Firm*—Oblon, Spivak, McClelland, Maier & Neustadt, P.C.

(57) ABSTRACT

The present invention provides a nonaqueous electrolyte secondary battery, comprising a positive electrode, a negative electrode containing a carbon material having an immersion heat ratio ($\Delta H_i^n/\Delta H_i^h$) defined by formula (1), and a nonaqueous electrolyte:

$$1.2 \leq \Delta H_i^n/\Delta H_i^h \leq 2 \qquad (1)$$

where $\Delta H_i^h$ denotes the immersion heat for n-heptane of the carbon material, and $\Delta H_i^n$ denotes the immersion heat for 1-nitropropane of the carbon material.

12 Claims, 2 Drawing Sheets

NONAQUEOUS ELECTROLYTE SECONDARY BATTERY, CARBON MATERIAL FOR NEGATIVE ELECTRODE, AND METHOD FOR MANUFACTURING CARBON MATERIAL FOR NEGATIVE ELECTRODE

CROSS-REFERENCE TO RELATED APPLICATIONS

This application is based upon and claims the benefit of priority from the prior Japanese Patent Applications No. 11-361594, filed Dec. 20, 1999; and No. 2000-300991, filed Sep. 29, 2000, the entire contents of which are incorporated herein by reference.

BACKGROUND OF THE INVENTION

The present invention relates to a nonaqueous electrolyte secondary battery, a carbon material for a negative electrode used for preparing a negative electrode of a battery such as a nonaqueous electrolyte secondary battery, and a method of manufacturing a carbon material for the negative electrode.

In recent years, various portable electronic appliances are being propagated in accordance with a rapid progress in the miniaturization technology of an electronic equipment. Miniaturization is also required for a battery used as a power source of these portable electronic appliances, and a nonaqueous electrolyte secondary battery having a high energy density attracts attentions.

A nonaqueous electrolyte secondary battery using metal lithium as the negative electrode active material has a very high energy density. However, the secondary battery of this type is short in the battery life because a tree branch-like crystals called dendrite are precipitated on the negative electrode in the charging step. The secondary battery of this type also leaves room for further improvement in safety because the dendrite grows to reach the positive electrode so as to bring about a problem such as an internal short circuit.

Under the circumstances, it is attempted to use a lithium alloy, a carbon material, an amorphous chalcogen compound in place of the lithium metal as the negative electrode active material. However, when it comes to the negative electrode containing a lithium alloy, the lithium alloy tends to be finely pulverized in accordance with progress of the charge-discharge cycles, with the result that the secondary battery is rendered poor in the cycle life. Also, when it comes to the negative electrode containing an amorphous chalcogen compound, an irreversible reaction tends to take place in the initial charging step, leading to a problem that the initial charging efficiency is low. Such being the situation, a carbon material capable of ensuring a safety and a long cycle life of the secondary battery is put to a practical use substantially exclusively as the negative electrode active material of the nonaqueous electrolyte secondary battery.

It was customary in the past to use as a carbon material in a nonaqueous electrolyte secondary battery a carbonized material or a graphitized material obtained by subjecting a carbon precursor such as pitch, coke, and polymer to a heat treatment under an inert gas atmosphere as well as a natural graphite, synthetic graphite and a low temperature calcined carbon.

However, since the capacity of the carbon material used as a negative electrode material is small compared with, for example, lithium metal and a lithium alloy, the nonaqueous electrolyte secondary battery comprising a negative electrode containing a carbon material gives rise to a problem that it is impossible to obtain a high discharge capacity.

Japanese Patent Disclosure (Kokai) No. 5-28996 recites a secondary battery comprising at least a positive electrode active material, a negative electrode active material, and an organic electrolyte, characterized in that a natural graphite subjected to a heat treatment at 400 to 800° C. in the presence of an atmosphere consisting of an inert gas or in the vacuum before use is used singly or in combination with another material as a negative electrode material.

On the other hand, Japanese Patent Disclosure No. 6-290781 discloses a lithium secondary battery in which a natural graphite is used as a negative electrode material capable of absorbing-desorbing lithium ions, characterized in that said natural graphite is subjected to a heat treatment under temperatures not lower than 1800° C. in the presence of an atmosphere consisting of an inert gas.

Further, Japanese Patent Disclosure No. 9-55204 discloses a method of manufacturing a lithium ion secondary battery comprising an anode containing carbon capable of reversibly inserting lithium, wherein the carbon is heated in a sufficiently long time and under a sufficient high temperature in the presence of an atmosphere containing $O_2$ before the battery is assembled so as to selectively oxidize and gasify the undesirable highly reactive carbon atoms, thereby removing the undesirable highly reactive carbon atoms.

Further, a method of removing the impurities by applying a heat treatment to a carbon material is described in "Journal of Power Sources, Vol. 76, pp 180–185, 1998".

On the other hand, claim 1 of Japanese Patent Disclosure No. 10-40914 recites a nonaqueous secondary battery, comprising a negative electrode containing as a negative electrode active material graphite particles having an amorphous carbon attached to the surface, a positive electrode containing a chalcogen compound containing lithium as a positive electrode active material, and a nonaqueous ionic conductor, characterized in that the negative electrode active material is prepared by subjecting graphite particles to an oxidizing treatment, followed by attaching an amorphous carbon to the surfaces of the graphite particles.

Also, claim 1 of Japanese Patent Disclosure No. 10-214615 discloses a nonaqueous secondary battery, comprising a negative electrode, a positive electrode containing a chalcogen compound, which contains lithium, as a positive electrode active material, and a nonaqueous ionic conductor, characterized in that the negative electrode contains as a negative electrode active material a carbon material prepared by attaching an amorphous carbon to the surfaces of graphite particles subjected to an oxidizing treatment with potassium permanganate.

However, any of the secondary batteries disclosed in the six publications referred to above failed to exhibit a sufficient discharge capacity.

BRIEF SUMMARY OF THE INVENTION

An object of the present invention is to provide a nonaqueous electrolyte secondary battery having a high capacity and excellent in the cycle life characteristics.

Another object of the present invention is to provide a carbon material for a negative electrode capable of increasing the capacity of a nonaqueous electrolyte secondary battery and a method of manufacturing the particular carbon material for a negative electrode.

According to a first aspect of the present invention, there is provided a nonaqueous electrolyte secondary battery, comprising a positive electrode, a nonaqueous electrolyte, and a negative electrode containing a carbon material having an immersion heat ratio ($\Delta H_i^n/\Delta H_i^h$) defined by formula (1):

$$1.2 \leq \Delta H_i^n/\Delta H_i^h \leq 2 \qquad (1)$$

where $\Delta H_i^h$ denotes the immersion heat for n-heptane of the carbon material, and $\Delta H_i^n$ denotes the immersion heat for 1-nitropropane of the carbon material.

According to a second aspect of the present invention, there is provided a carbon material for a negative electrode, having an immersion heat ratio ($\Delta H_i^n/\Delta H_i^h$) defined by formula (1):

$$1.2 \leq \Delta H_i^n/\Delta H_i^h \leq 2 \qquad (1)$$

where $\Delta H_i^h$ denotes the immersion heat for n-heptane of the carbon material, and $\Delta H_i^n$ denotes the immersion heat for 1-nitropropane of the carbon material.

According to a third aspect of the present invention, there is provided a first method of manufacturing a carbon material for a negative electrode, comprising the step of applying a heat treatment to a carbonaceous material containing at least one material selected from the group comprising a carbonized material and a graphitized material under a gaseous atmosphere selected from the group consisting of a first gaseous atmosphere containing at least 10% by volume of $CO_2$, a second gaseous atmosphere containing at least 1% by volume of $H_2O$, and a third gaseous atmosphere containing at least 10% by volume of $CO_2$ and at least 1% by volume of $H_2O$.

According to a fourth aspect of the present invention, there is provided a second method of manufacturing a carbon material for a negative electrode, comprising the step of applying a heat treatment to a carbon precursor under a gaseous atmosphere selected from the group consisting of a first gaseous atmosphere containing at least 10% by volume of $CO_2$, a second gaseous atmosphere containing at least 1% by volume of $H_2O$, and a third gaseous atmosphere containing at least 10% by volume of $CO_2$ and at least 1% by volume of $H_2O$ so as to carbonize or graphitize the carbon precursor.

According to a fifth aspect of the present invention, there is provided a third method of manufacturing a carbon material for a negative electrode, comprising the step of applying a heat treatment to a carbonaceous material containing at least one material selected from the group comprising a carbonized material and a graphitized material under an atmosphere containing at least one of a gas of an inorganic acid and a gas of an organic acid.

According to a sixth aspect of the present invention, there is provided a fourth method of manufacturing a carbon material for a negative electrode, comprising the step of:

applying a heat treatment to a carbonaceous material containing at least one material selected from the group comprising the carbonized material and the graphitized material under a gaseous atmosphere selected from the group consisting of a first gaseous atmosphere containing at least 10% by volume of $CO_2$, a second gaseous atmosphere containing at least 1% by volume of $H_2O$ and a third gaseous atmosphere containing at least 10% by volume of $CO_2$ and at least 1% by volume of $H_2O$; and bringing the carbonaceous material into contact with a gaseous acid.

Further, according to a seventh aspect of the present invention, there is provided a fifth method of manufacturing a carbon material for a negative electrode, comprising the step of:

applying a heat treatment to a carbon precursor under a gaseous atmosphere selected from the group consisting of a first gaseous atmosphere containing at least 10% by volume of $CO_2$, a second gaseous atmosphere containing at least 1% by volume of $H_2O$ and a third gaseous atmosphere containing at least 10% by volume of $CO_2$ and at least 1% by volume of $H_2O$ so as to carbonize or graphitize the carbon precursor; and bringing the carbon precursor into contact with a gaseous acid.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Figure 1:
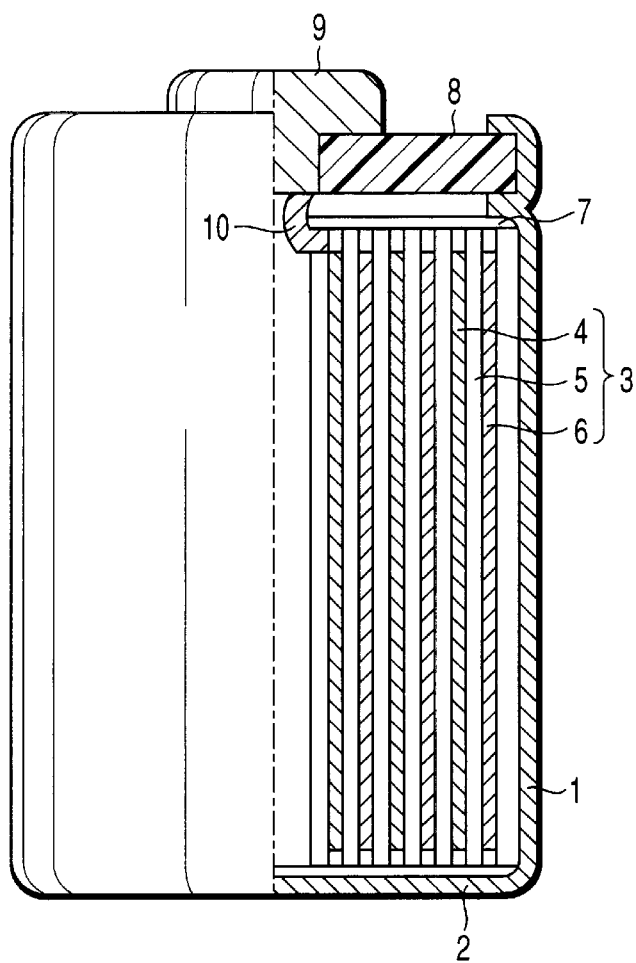
FIG. 1 is a partial cross sectional view showing a cylindrical nonaqueous electrolyte secondary battery as an example of the nonaqueous electrolyte secondary battery of the present invention.

A method of manufacturing any of first to fifth carbon materials for a negative electrode according to the present invention will now be described.

1. First Manufacturing Method of Carbon Material for Negative Electrode

The manufacturing method of a first carbon material for a negative electrode comprises the step of applying a heat treatment to a carbonaceous material containing at least material selected from the group consisting essentially of a carbonized material and a graphitized material under a gaseous atmosphere selected from the group consisting of a first gaseous atmosphere containing at least 10% by volume of $CO_2$, a second gaseous atmosphere containing at least 1% by volume of $H_2O$, and a third gaseous atmosphere containing at least 10% by volume of $CO_2$ and at least 1% by volume of $H_2O$. The term "gaseous atmosphere" represents the gas introduced into the calcining furnace in the step of the heat treatment.

The carbonized material can be obtained by applying a heat treatment to a carbon precursor such as pitch, coke or polymer. The carbonized material used in the present invention includes, for example, an amorphous carbon and a soft carbon. On the other hand, the graphitized material can be obtained by applying a heat treatment to a carbon precursor such as pitch, coke or polymer so as to carbonize the carbon precursor, followed by applying again a heat treatment to the carbonized material thus obtained. The carbonizing treatment and the graphitizing treatment can be performed by the methods that are to be described herein later in conjunction with a second manufacturing method. Also, it is possible to use, for example, carbon calcined at a low temperature as the carbonized material. On the other hand, it is possible to use, for example, a natural graphite or a synthetic graphite as the graphitized material.

In the present invention, it is possible to use a mixture of a carbonized material and a graphitized material as a carbonaceous material.

It is desirable for each of the carbonized material and the graphitized material to have 0.34 nm or less of an interplanar spacing $d_{002}$ derived from (002) reflection, which was determined by an X-ray diffractometry. More desirably, the interplanar spacing $d_{002}$ noted above should fall within a range of between 0.335 nm and 0.34 nm.

It is possible for each of the carbonized material and the graphitized material to contain another element such as boron, phosphorus and fluorine. In order to improve the reaction rate, it is desirable to add an alkaline metal or an alkaline earth metal to the carbonaceous material.

It is desirable for the heat treating temperature T (° C.) to meet formula (2) given below:

$$(T_1+T_2)/2 \leq T \leq T_2 \qquad (2)$$

where T denotes the temperature (° C.) for the heat treatment, $T_1$ denotes the peak temperature (° C.) of the endothermic peak obtained when a differential thermal analysis is applied to the carbonaceous material under the gaseous atmosphere noted above, and $T_2$ denotes the peak temperature (° C.) of the exothermic peak obtained by the differential thermal analysis.

The differential thermal analysis is applied to a carbonaceous material before the heat treatment. The measuring atmosphere in the step of the differential thermal analysis is equal in composition to the gaseous atmosphere for the heat treatment. Also, since the peak temperature obtained by the differential thermal analysis is affected by the amount of the sample, the flow rate of the atmosphere gas, the temperature elevation rate, it is desirable to set the sample weight at about 50 mg, the flow rate of the atmosphere gas at about 100 mL (milliliter)/min, and the temperature elevation rate at about 20° C./min in obtaining the values of $T_1$ and $T_2$.

The peak temperature $T_1$ of the endothermic peak is generated by the dehydrating reaction of the carbonaceous material or the gasifying reaction of the volatile component from the carbonaceous material. On the other hand, the peak temperature $T_2$ (° C.) of the exothermic peak is generated by the oxidizing reaction of the carbonaceous material. It is possible to improve markedly the capacity of the secondary battery by setting the heat treating temperature T to fall within the range defined by formula (2). If the heat treating temperature is set lower than $(T_1+T_2)/2$, the surface modifying reaction is unlikely to proceed, resulting in failure to obtain a high battery capacity. On the other hand, if the heat treating temperature is set higher than $T_2$, the entire carbonaceous material tends to be rapidly oxidized, making it difficult to improve sufficiently the capacity. Also, the weight reduction caused by the oxidation of the carbonaceous material tends to be increased.

It is desirable for the optimum heat treating time, which tends to differ depending on the manufacturing conditions such as the heat treating temperature, to fall within a range of between 0.5 hour and 48 hours, more preferably between 1 hour and 12 hours.

The gas contained in the atmosphere for the heat treatment other than $CO_2$ and $H_2O$ includes at least one kind of gas selected from the group consisting of an oxygen gas, a nitrogen gas and an inert gas. The inert gas includes, for example, an argon gas, a helium gas, a xenon gas, and a krypton gas. Particularly, it is desirable to use the gas noted above in combination with a non-oxidizing gas represented by a nitrogen gas and the inert gas. Also, it is desirable for an oxygen gas not to be contained in the atmosphere for the heat treatment, i.e., the gas introduced into the calcining furnace. However, where an oxygen gas is contained in the atmosphere for the heat treatment, it is desirable for the oxygen gas content not to exceed 10% by volume. If an oxygen gas is contained in the atmosphere for the heat treatment in an amount exceeding 10% by volume, the combustion reaction between oxygen and carbon is tend to generate. As a result, it is possibly difficult to obtain a desirable surface state. At the same time, it is possible for the gasifying amount in the step of the surface treatment of the carbonaceous material to be increased so as to lower the yield.

The method of the present invention for manufacturing a first carbon material for a negative electrode described above comprises the step of applying a heat treatment to a carbonaceous material containing at least one material selected from the group consisting essentially of a carbonized material and a graphitized material under a gaseous atmosphere selected from the group consisting of a first gaseous atmosphere containing at least 10% by volume of $CO_2$, a second gaseous atmosphere containing at least 1% by volume of $H_2O$, and a third gaseous atmosphere containing at least 10% by volume of $CO_2$ and at least 1% by volume of $H_2O$. The particular manufacturing method of the present invention makes it possible to provide a carbon material for a negative electrode capable of achieving a nonaqueous electrolyte secondary battery having a large capacity. The particular effect of the present invention is believed to be derived from the mechanism described below.

Specifically, the reaction for converting carbon into a carbon dioxide gas in the presence of $O_2$ is a combustion reaction and, thus, an exothermic reaction. On the other hand, the reaction for converting carbon into a carbon dioxide gas in the presence of $H_2O$ or $CO_2$ is an endothermic reaction. It follows that carbon is unlikely to be gasified in the presence of $H_2O$ or $CO_2$, compared with the case where carbon is gasified in the presence of $O_2$. If a heat treatment is applied to at least one of the carbonized material and the graphitized material under the first, second or third gaseous atmosphere, it is possible to selectively convert a portion having a low degree of graphitization, which is easier to be gasified, into a carbon dioxide gas while leaving unremoved a portion having a high degree of graphitization and a high electrical conductivity because the particular portion has a low gasifying rate. Also, since the gasifying reaction proceeds moderately, it is possible to have fine pores formed uniformly by the gasifying reaction on the surface of and inside the carbonaceous material. Further, it is possible to increase the crystallinity of the carbonaceous material by the heat treatment. As a result, it is possible to improve the electrical conductivity of the carbonaceous material and the utilization of the lithium absorbing site. Further, some of the pores can perform the function of the lithium absorbing site. As a result, it is possible to improve the capacity of the nonaqueous electrolyte secondary battery.

It should be noted that if the $CO_2$ content of the gaseous atmosphere is set lower than 10% by volume and, at the same time, if the $H_2O$ content of the gaseous atmosphere is set lower than 1% by volume, the gasifying reaction amount in a portion having a low degree of graphitization is rendered insufficient, with the result that it is difficult to obtain a high discharge capacity in a secondary battery. Also, if $O_2$ is used in place of $H_2O$ and $CO_2$, the combustion reaction of carbon is generated rapidly, making it difficult to selectively gasify the portion having a low degree of graphitization.

Also, where the heat treating temperature T is not lower than 2,000° C., it is desirable to set the $CO_2$ concentration in the first gaseous atmosphere and the third gaseous atmosphere to fall within a range of between 10% by volume and 60% by volume. If the $CO_2$ concentration exceeds 60% by volume in the case where the heat treating temperature T is not lower than 2,000° C., the gasifying reaction rate is increased, making it possible for even the portion having a high degree of graphitization to be gasified. On the other hand, where the heat treating temperature T is lower than 2,000° C., it is desirable to set the $CO_2$ concentration in the first gaseous atmosphere and the third gaseous atmosphere to fall within a range of between 50% by volume and 100% by volume. If the $CO_2$ concentration in the first gaseous atmosphere is lower than 50% in the case where the heat treating temperature is lower than 2,000° C., the reaction is unlikely to proceed promptly so as to make it difficult to obtain a carbon material having a high capacity in a short heat treating time.

Where the heat treating temperature is not lower than 2,000° C., it is desirable to set the $H_2O$ content of the second gaseous atmosphere and the third gaseous atmosphere to fall within a range of between 1.5% by volume and 30% by volume. If the $H_2O$ concentration in the second gaseous atmosphere exceeds 30% by volume in the case where the heat treating time is not lower than 2,000° C., the gasifying reaction rate is increased so as to make it possible for even the portion having a high degree of graphitization to be gasified. Also, where the heat treating temperature is lower than 2,000° C., it is desirable for the $H_2O$ concentration in the second gaseous atmosphere and the third gaseous atmosphere to fall within a range of between 2% by volume and 100% by volume. If the $H_2O$ concentration in the second gaseous atmosphere is lower than 2% volume in the case where the heat treating temperature T is lower than 2,000° C., the reaction is unlikely to proceed promptly so as to make it difficult to obtain a carbon material having a high capacity in a short heat treating time.

In the method of the present invention for manufacturing the first carbon material for a negative electrode, the heat treating temperature T is set to meet formula (2) described previously. The nonaqueous electrolyte secondary battery comprising a negative electrode containing the carbon material manufactured by the method of the present invention exhibits a further improved capacity and also exhibits an improved initial charge-discharge efficiency and improved large current characteristics.

2. Second Manufacturing Method of Carbon Material for Negative Electrode

The manufacturing method of a second carbon material comprises the step of applying a heat treatment to a carbon precursor under a gaseous atmosphere selected from the group consisting of a first gaseous atmosphere containing at least 10% by volume of $CO_2$, a second gaseous atmosphere containing at least 1% by volume of $H_2O$, and a third gaseous material containing at least 10% by volume of $CO_2$ and at least 1% by volume of $H_2O$ so as to carbonize or graphitize the carbon precursor.

It is possible to use as the carbon precursor any of a material containing carbon as a main component, a material capable of carbonization, and a material capable of graphitization. To be more specific, the carbon precursor used in the present invention includes, for example, pitch, coke and polymer. It is possible for the carbon precursor to contain another element such as boron, phosphorus or fluorine. Also, in order to increase the reaction rate, it is effective to add an alkaline metal or an alkaline earth metal to the carbon precursor.

It is desirable to set the heat treating temperature at 800° C. to 3,000° C. If the heat treating temperature is lower than 800° C., a carbon material having the graphite structure not developed therein sufficiently and having a volatile component, which was originally contained in the carbon precursor, left contained therein in a large amount is likely to be obtained. Since the carbon material thus obtained has a low electrical conductivity, the large current discharge characteristics and the cycle characteristics of the secondary battery are lowered. On the other hand, if the heat treatment is carried out under temperatures exceeding 3,000° C., it is possible for the manufacturing cost to be increased. Alternatively, the manufacturing process tends to be made complex. Particularly, it is possible to improve the discharge capacity and the cycle life characteristics of the secondary battery by setting the heat treating temperature to fall within a range of between 2,000° C. and 3,000° C. Naturally, it is more desirable for the heat treating temperature to fall within a range of between 2,000° C. and 3,000° C., and most desirably to fall within a range of between 2,500° C. and 3,000° C.

Where the heat treating temperature is not lower than 2,000° C., it is desirable for the $CO_2$ concentration in the first gaseous atmosphere and the third gaseous atmosphere to fall within a range of between 10% by volume and 60% by volume for the reasons described previously in conjunction with the manufacturing method of the first carbon material. Also, it is desirable for the $H_2O$ concentration in the second gaseous atmosphere and the third gaseous atmosphere to fall within a range of between 1.5% by volume and 30% by volume for the reasons described previously in conjunction with the manufacturing method of the first carbon material.

On the other hand, where the heat treating temperature T is lower than 2,000° C., it is desirable to set the $CO_2$ concentration in the first gaseous atmosphere and the third gaseous atmosphere to fall within a range of between 50% by volume and 100% by volume for the reasons described previously in conjunction with the manufacturing method of the first carbon material. Further, it is desirable to set the $H_2O$ concentration in the second gaseous atmosphere and the third gaseous atmosphere to fall within a range of between 2% by volume and 100% by volume for the reasons described previously in conjunction with the manufacturing method of the first carbon material.

It is desirable for the optimum heat treating time, which tends to differ depending on the manufacturing conditions such as the heat treating temperature, to fall within a range of between 0.5 hour and 48 hours, more preferably between 1 hour and 12 hours.

The gas contained in the atmosphere for the heat treatment other than $CO_2$ and $H_2O$ includes at least one kind of gas selected from the group consisting of an oxygen gas, a nitrogen gas and an inert gas. The inert gas includes, for example, an argon gas, a helium gas, a xenon gas, and a krypton gas. Particularly, it is desirable to use the gas noted above in combination with a non-oxidizing gas represented by a nitrogen gas and the inert gas. Also, it is desirable for an oxygen gas not to be contained in the atmosphere for the heat treatment, i.e., the gas introduced into the calcining furnace. However, where an oxygen gas is contained in the atmosphere for the heat treatment, it is desirable for the oxygen gas content not to exceed 10% by volume for the reasons described previously in conjunction with the first manufacturing method of the carbon material.

The method of the present invention described above for manufacturing the second carbon material comprises the step of applying a heat treatment to a carbon precursor under an gaseous atmosphere selected from the group consisting of the first gaseous atmosphere containing at least 10% by volume of $CO_2$, the second gaseous atmosphere containing at least 1% by volume of $H_2O$, and the third gaseous atmosphere containing at least 10% by volume of $CO_2$ and at least 1% by volume of $H_2O$ so as to carbonize or graphitize the carbon precursor. The particular method of the present invention makes it possible to provide a carbon material for a negative electrode that permits realizing a nonaqueous electrolyte secondary battery of a high capacity. The particular effect of the present invention is believed to be derived from the mechanism described below.

Specifically, in the present invention, a region having a low degree of graphitization can be selectively gasified while carbonizing or graphitizing the carbon precursor so as to improve the electrical conductivity and to improve the utilization of the lithium absorbing site. In addition, it is possible to manufacture a carbon material in which some of pores perform the function of the lithium absorbing site. As a result, a nonaqueous electrolyte secondary battery comprising a negative electrode containing the particular carbon material exhibits an improved capacity.

3. Third Manufacturing Method of Carbon Material for Negative Electrode

The third manufacturing method of the carbon material comprises the step of applying a heat treatment to a carbonaceous material containing at least one material selected from the group consisting essentially of a carbonized material and a graphitized material under an atmosphere containing at least one of a gas of an inorganic acid and a gas of an organic acid.

The carbonized material can be obtained by applying a heat treatment to a carbon precursor such as pitch, coke or polymer. The carbonized material used in the present invention includes, for example, an amorphous carbon and a soft carbon. On the other hand, the graphitized material can be obtained by applying a heat treatment to a carbon precursor such as pitch, coke or polymer so as to carbonize the carbon precursor, followed by applying again a heat treatment to the carbonized material thus obtained. It is desirable to carry out the carbonizing treatment and the graphitizing treatment by the method described previously in conjunction with the second manufacturing method of a carbon material. Also, it is possible to use, for example, carbon calcined under a low temperature as the carbonized material. On the other hand, it is possible to use, for example, a natural graphite or a synthetic graphite as the graphitized material.

In the present invention, it is possible to use a mixture of a carbonized material and a graphitized material as a carbonaceous material.

It is desirable for each of the carbonized material and the graphitized material to have not larger than 0.34 nm of an interplanar spacing $d_{002}$ derived from (002) reflection, which was determined by X-ray diffractometry. More desirably, the interplanar spacing $d_{002}$ noted above should fall within a range of between 0.335 nm and 0.34 nm.

It is possible for each of the carbonized material and the graphitized material to contain another element such as boron, phosphorus or fluorine. Also, in order to promote the reaction rate, it is effect to add an alkaline metal or an alkaline earth metal to at least one of the carbonaceous materials noted above.

The inorganic acid used in the present invention includes, for example, nitric acid, hydrochloric acid, sulfuric acid, hydrofluoric acid, boric acid and phosphoric acid. On the other hand, the organic acid used in the present invention includes, for example, formic acid, acetic acid, propionic acid, phenol and oxalic acid.

Among the organic acids and inorganic acids exemplified above, it is particularly desirable to use a Lewis acid having a high oxidizing power and capable of imparting an oxygen atom in order to improve the electrode capacity. Particularly, it is desirable to use an acid having a high oxidizing power such as nitric acid and organic acid such as acetic acid in order to improve the electrode characteristics. The most desirable acid is nitric acid. In the case of using nitric acid, it is desirable for the reaction temperature to be not lower than 130° C. that is the boiling point of a nitric acid aqueous solution.

The inorganic acid and the organic acid exemplified above make it possible to introduce into the carbonaceous material a functional group having a polar group such as a functional group having a boron atom, a functional group having a nitrogen atom, a functional group having an oxygen atom, and a functional group having a phosphorus atom. Particularly, a functional group having an oxygen atom such as a carboxyl group, a carbonyl group, a hydroxyl group, a lactone group, or a ketone group can be introduced easily into the carbonaceous material. These functional groups are considered to be introduced into the carbonaceous material in the heat treating step. Also, these functional groups, which perform the function of a lithium absorbing site, serve to improve the wettability between a polar solvent of liquid nonaqueous electrolyte and the carbon material in the negative electrode so as to improve the electrode characteristics.

As a gas of an inorganic acid, it is possible to use a water vapor containing a vapor of an inorganic acid, which is prepared by boiling an aqueous solution of an inorganic, in addition to a vapor of an inorganic acid. On the other hand, as a gas of an organic acid, it is possible to use a water vapor containing a vapor of an organic acid, which is prepared by boiling an aqueous solution of an organic acid, in addition to a vapor of an organic acid.

The gas contained in the atmosphere other than the gas of an inorganic acid and the gas of an organic acid includes at least one kind of a gas selected from the group consisting of an oxygen gas, a nitrogen gas and an inert gas. The inert gas used in the present invention includes, for example, an argon gas, a helium gas, xenon gas, and krypton gas. Particularly, it is desirable to use a non-oxidizing gas represented by a nitrogen gas and the inert gas together with the gas of the inorganic acid or the gas of the organic acid.

It is desirable for the heat treating temperature to be not higher than 800° C. If the heat treating temperature exceeds 800° C., the reaction proceeds rapidly, with the result that it is possibly difficult to apply a uniform acid treatment to the surface of the carbonaceous material. More desirably, the heat treating temperature should not be higher than 500° C. Also, the lower limit of the heat treating temperature should be set to permit the inorganic acid or the organic acid to be present in a gaseous state in the atmosphere under which the heat treatment is performed. It follows that it is desirable to set the heat treating temperature to fall within a range between the vaporizing temperature of the inorganic acid or the organic acid and 800° C.

The heat treating method includes methods (a) to (c) given below, though the heating treating method is not limited to these methods (a) to (c):

(a) At least one of the gaseous inorganic acid and the gaseous organic acid is circulated onto a carbonaceous material consisting of at least one of the carbonized material and the graphitized material, and the heating is applied under the particular condition.

(b) An acid is added to the carbonaceous material so as to prepare a dispersion or a slurry, followed by applying a heat treatment to the dispersion or the slurry at a temperature not lower than the boiling point of the acid.

(c) An acid acting as a granulating agent is added to the carbonaceous material so as to granulate the carbonaceous material, and the reaction is performed when the resultant grains are dried at high temperatures.

The third method of the present invention for manufacturing a carbon material for a negative electrode comprises the step of applying a heat treatment to a carbonaceous material containing at least material selected from the group consisting essentially of the carbonized material and the graphitized material under an atmosphere containing at least one of an inorganic gas and an organic gas. The nonaqueous electrolyte secondary battery comprising a negative electrode containing the carbon material manufactured by the particular method exhibits an improved initial charge-discharge efficiency, an improved discharge capacity and an improved charge-discharge cycle life. The particular effect is believed to be produced by the mechanism described below.

Specifically, if a heat treatment is applied to the carbonaceous material under an atmosphere containing at least one of a vapor of an organic acid and a vapor of an inorganic acid as in the third manufacturing method of the present invention, it is possible to form fine pores on the surface of the carbonaceous material. It is also possible to introduce a functional group, particularly, a functional group having a polar group such as a carboxyl group, a carbonyl group, a hydroxyl group, a lactone group or a ketone group, into the surface region of the carbonaceous material. These functional groups perform the function of lithium absorbing site and, at the same time, serve to improve the wettability between the liquid nonaqueous electrolyte, which is a polar solvent, and the carbon material in the negative electrode. As a result, the nonaqueous electrolyte secondary battery comprising the negative electrode containing the carbon material manufactured by the method of the present invention is enabled to exhibit an improved initial charge-discharge efficiency, an improve discharge capacity and an improved charge-discharge cycle life.

It is possible to apply both the third manufacturing method and the first manufacturing method described previously to the carbonaceous material as a surface modifying treatment. It is also possible to apply the first manufacturing method and/or the third manufacturing method as a surface modifying treatment to the carbon material prepared by the second manufacturing method of the carbon material described previously.

Particularly preferred combinations are that (I) a surface modifying treatment is applied by the third manufacturing method to the carbon material for a negative electrode manufactured by the second manufacturing method, and that (II) a surface modifying treatment is applied by the first manufacturing method to the carbonaceous material consisting of at least one of the graphitized material and the carbonized material, followed by applying a finish surface modifying treatment by the third manufacturing method. According to methods (I) and (II) described above, it is possible to obtain a carbon material for a negative electrode having better characteristics produced by the synergetic effect of each treatment.

4. Fourth Manufacturing Method of Carbon Material for Negative Electrode

The fourth manufacturing method of a carbon material for a negative electrode comprises the steps of applying a heat treatment to a carbonaceous material containing at least one material selected from the group consisting essentially of the carbonized material and the graphitized material under a gaseous atmosphere selected from the group consisting of a first gaseous atmosphere containing at least 10% by volume of $CO_2$, a second gaseous atmosphere containing at least 1% by volume of $H_2O$ and a third gaseous atmosphere containing at least 10% by volume of $CO_2$ and at least 1% by volume of $H_2O$, and bringing the carbonaceous material into contact with a gaseous acid.

It is desirable to use a vapor of an acid as the gaseous acid.

The heat treating step can be performed by the method similar to that described previously in conjunction with the first manufacturing method of the carbon material for a negative electrode.

It is possible to use as the gaseous acid at least one kind of a gas selected from the group consisting of a gas of an inorganic acid and a gas of an organic acid. The inorganic acid used in the present invention includes, for example, nitric acid, hydrochloric acid, sulfuric acid, hydrofluoric acid, boric acid and phosphoric acid. On the other hand, the organic acid used in the present invention includes, for example, formic acid, acetic acid, propionic acid, phenol and oxalic acid.

In addition to an inorganic acid vapor, it is possible to use as a gaseous inorganic acid, for example, a water vapor containing a vapor of an inorganic acid that is prepared by boiling an aqueous solution of an inorganic acid. On the other hand, in addition to an organic acid vapor, it is possible to use as a gaseous organic acid, for example, a water vapor containing a vapor of an organic acid that is prepared by boiling an aqueous solution of an organic acid.

It is desirable to apply a heat treatment to the carbonaceous material in order to maintain a gaseous state of the acid when the gaseous acid is brought into contact with the carbonaceous material having the heat treatment applied thereto. It is desirable for the heat treating temperature to fall within a range of between the vaporizing temperature of the inorganic acid or organic acid and 800° C. If the heat treating temperature exceeds 800° C., the reaction proceeds rapidly, with the result that it is possibly difficult to apply a uniform acid treatment to the surface of the carbonaceous material. It is more desirable for the heat treating temperature to fall within a range of between the vaporizing temperature of the inorganic acid or the organic acid and 500° C. Where, for example, nitric acid is used as the inorganic acid, it is desirable for the heat treating temperature to fall within a range of between 130° C. and 500° C.

The gaseous acid can be brought into contact with the carbonaceous material having a heat treatment applied thereto by methods (A) to (C) given below, though the contact method is not limited to these methods (A) to (C):

(A) A gas containing at least one of a gaseous inorganic acid and a gaseous organic acid is circulated onto the carbonaceous material consisting of at least one of the carbonized material and the graphitized material, and the carbonaceous material is heated under circulation of the gaseous material.

(B) An acid is added to the carbonaceous material so as to prepare a dispersion or a slurry, followed by subjecting the dispersion or the slurry to a heat treatment under temperatures higher than the boiling point of the acid.

(C) An acid acting as a granulating agent is added to the carbonaceous material so as to granulate the carbonaceous material and, then, the resultant grains are subjected to reaction when these grains are dried under high temperatures.

As described above, the fourth method of the present invention for manufacturing a carbon material for a negative electrode comprises the step of applying a heat treatment to a carbonaceous material containing at least one material selected from the group consisting essentially of the carbonized material and the graphitized material under a gaseous atmosphere selected from the group consisting of a first gaseous atmosphere containing at least 10% by volume of $CO_2$, a second gaseous atmosphere containing at least 1% by volume of $H_2O$, and a third gaseous atmosphere containing at least 10% by volume of $CO_2$ and at least 1% by volume of $H_2O$. Since that portion of the carbonaceous material which has a relatively high degree of graphitization has a low gasifying rate, compared with the portion having a low degree of graphitization, it is possible to selectively gasify the that portion of the carbonaceous material which has a low degree of graphitization. As a result, it is possible to form fine pores uniformly in the surface region and the inner region of the carbonaceous material.

In the next step, the carbonaceous material is brought into contact with the gaseous acid, making it possible to introduce uniformly a functional group, particularly, a functional group having a polarity such as a carboxyl group, a carbonyl group, a hydroxyl group, a lactone group or a ketone group into the surface region and the fine pores in the inner region of the carbonaceous material.

The carbon material thus prepared has a high crystallinity and an excellent electrical conductivity. Also, the fine pores formed in the surface region and the inner region of the carbonaceous material and the functional group introduced into the surface region and the fine pores perform the function of a lithium absorbing site. Further, since the polar functional group is present on the surface and in the inner region of the carbonaceous material, it is possible to improve the wettability between the liquid nonaqueous electrolyte, which is a polar solvent, and the carbon material contained in the negative electrode. As a result, it is possible for the nonaqueous electrolyte secondary battery comprising the negative electrode containing the carbon material manufactured by the method of the present invention to exhibit a markedly improved initial charge-discharge efficiency, a markedly improved discharge capacity, and a markedly improved charge-discharge cycle life.

5. Fifth Manufacturing Method of Carbon Material for Negative Electrode

The fifth manufacturing method of a carbon material for a negative electrode comprises the steps of applying a heat treatment to a carbon precursor under a gaseous atmosphere selected from the group consisting of a first gaseous atmosphere containing at least 10% by volume of $CO_2$, a second gaseous atmosphere containing at least 1% by volume of $H_2O$ and a third gaseous atmosphere containing at least 10% by volume of $CO_2$ and at least 1% by volume of $H_2O$ so as to carbonize or graphitize the carbon precursor and, thus, to obtain a carbonaceous material, and bringing the carbonaceous material into contact with a gaseous acid.

It is desirable to use a vapor of an acid as the gaseous acid.

The carbonizing treating step and the graphitizing treating step can be performed by the methods similar to those described previously in conjunction with the second manufacturing method of a carbon material for a negative electrode.

On the other hand, the acid treating step can be performed by the method similar to that described previously in conjunction with the fourth method of manufacturing a carbon material for a negative electrode.

According to the fifth method of the present invention for manufacturing a carbon material for a negative electrode, a heat treatment is applied to a carbon precursor under a gaseous atmosphere selected from the group consisting of a first gaseous atmosphere containing at least 10% by volume of $CO_2$, a second gaseous atmosphere containing at least 1% by volume of $H_2O$ and a third gaseous atmosphere containing at least 10% by volume of $CO_2$ and at least 1% by volume of $H_2O$ so as to carbonize or graphitize the carbon precursor and, thus, to obtain a carbonaceous material. As a result, fine pores are formed uniformly in the surface region and inner region of the carbonaceous material, making it possible to obtain a carbonaceous material having a high electrical conductivity.

In the next step, the carbonaceous material is brought into contact with a gaseous acid so as to make it possible to introduce uniformly a functional group, particularly, a functional group having a polarity such as a carboxyl group, a carbonyl group, a hydroxyl group, a lactone group or a ketone group, into the surface region and the fine pores present in the inner region of the carbonaceous material.

The carbon material thus prepared exhibits a high electrical conductivity. Also, the fine pores formed in the surface region and inner region of the carbon material and the polar function group present within the pore and on the surface region perform the function of a lithium absorbing site. Further, since the polar functional group is present in the surface region and inner region of the carbon material, it is possible to improve the wettability between the liquid non-aqueous electrolyte, which is a polar solvent, and the carbon material contained in the negative electrode. As a result, it is possible for the nonaqueous electrolyte secondary battery comprising the negative electrode containing the carbon material manufactured by the method of the present invention to exhibit a markedly improved initial charge-discharge efficiency, a markedly improved discharge capacity, and a markedly improved charge-discharge cycle life.

A nonaqueous electrolyte secondary battery of the present invention will now be described.

A nonaqueous electrolyte secondary battery of the present invention comprises a container, a positive electrode housed in said container, a negative electrode housed in said container, said negative electrode containing a carbon material having an immersion heat ratio ($\Delta H_i^n/\Delta H_i^h$) defined by formula (1), and a nonaqueous electrolyte housed in the container:

$$1.2 \leq \Delta H_i^n/\Delta H_i^h \leq 2 \tag{1}$$

where $\Delta H_i^h$ denotes the immersion heat for n-heptane of the carbon material, and $\Delta H_i^n$ denotes the immersion heat for 1-nitropropane of the carbon material.

The negative electrode, the positive electrode, the nonaqueous electrolyte and the container will now be described in detail.

1) Negative Electrode

The negative electrode comprises a current collector and an active material-containing layer containing a carbon material, said layer being formed on one surface or both surfaces of the current collector.

The carbon material will now be described in detail.

As apparent from formula (I) given below, the immersion heat $\Delta H_i$ denotes the sum of the dispersion force $h_i^d$, the polarizing force $h_i^\alpha$, and the mutual function $h_i^\mu$ between the permanent dipole of the liquid and the static electric field on the surface of the solid:

$$\Delta H_i = h_i^d + h_i^\alpha + h_i^\mu \qquad (I)$$

If $h_i^d + h_i^\alpha$ in formula (I) is considered to be constant, $\Delta H_i$ corresponds to the change in $h_i^\mu$. If F represents the intensity of the static electric field on the solid surface, the relationship denoted by formula (II) given below is established:

$$h_i^\mu = -n\mu F \qquad (II)$$

It follows that formula (III) given below is established:

$$\Delta H_i = n\mu F + \text{const.} \qquad (III)$$

In formulas (II) and (III) given above, $\mu$ represents the dipole efficiency of the immersion liquid, and n represents the number of adsorbed molecules per unit surface area.

If the immersion heat is obtained by using a series of adsorbates differing from each other in the dipole efficiency and being equal to each other in the absorption area of a single molecule, it is possible to obtain the intensity of the static electric field on the surface, i.e., the surface polarity, from the relationships specified in formulas (I) to (III) given above.

N-heptane and 1-nitropropane are equal to each other in the adsorption area of a single molecule. It should be noted that n-heptane has a dipole efficiency $\mu$ of 0D. On the other hand, 1-nitropropane has a dipole efficiency $\mu$ of 3.75D. It follows that the difference in the immersion heat between these two solvents reflects the surface polarity. A ratio of the immersion heat $\Delta H_i^n$ of the carbon material for 1-nitropropane to the immersion heat $\Delta H_i^h$ of the carbon material for n-heptane, i.e., the ratio $\Delta H_i^n/\Delta H_i^h$, reflects mainly the surface polarity of the carbon material and the magnitude of the dispersion force of the carbon material relative to the solvent. To be more specific, the immersion heat ratio $\Delta H_i^n/\Delta H_i^h$ tends to be increased with increase in the surface polarity of the carbon material and also tends to be decreased with decrease in the particle diameter of the carbon material to increase the contribution of the carbon material to the dispersion force relative to the solvent.

The polarity on the surface of the carbon material is generated by a heterogeneous atom other than carbon present on the surface of the carbon material and by the functional group owned by the heterogeneous atom. The heterogeneous atom includes, for example, a boron atom, a nitrogen atom, an oxygen atom, and a phosphorus atom. Since the heterogeneous atom present on the surface of the carbon material and the functional group owned by the heterogeneous atom perform the function of an absorption-desorption site of lithium, it is possible to increase the lithium adsorption-desorption site of the carbon material. Also, it is possible to improve the affinity between the carbon material and the liquid nonaqueous electrolyte, which is a polar solvent, by increasing the polarity on the surface of the carbon material.

It should be noted that the immersion heat of n-heptane contained in the carbon material is substantially constant regardless of the magnitude of the polarity on the surface of the carbon material. On the other hand, the immersion heat of 1-nitropropane include with the carbon material is increased with increase in the polarity of the surface of the carbon material. Where the immersion heat ratio $\Delta H_i^n/\Delta H_i^h$ is less than 1.2, the immersion heat for 1-nitropropane included with the carbon material is small, and the polarity on the surface of the carbon material is low. It follows that the lithium absorption-desorption capacity of the carbon material is lowered so as to lower the discharge capacity of the secondary battery. On the other hand, where the immersion heat ratio $\Delta H_i^n/\Delta H_i^h$ exceeds 2, the immersion heat for 1-nitropropane included in the carbon material is large, and the polarity on the surface of the carbon material is high. However, an excessively large amount of the heterogeneous atoms present on the surface of the carbon material tends to lower the electrical conductivity of the carbon material and to invite a side reaction such as decomposition of the nonaqueous electrolyte. More desirably, the immersion heat ratio $\Delta H_i^n/\Delta H_i^h$ should fall with a range of between 1.25 and 1.75.

It is desirable for the average particle diameter of the carbon material to fall within a range of between 5 $\mu$m and 100 $\mu$m. If the average particle diameter is smaller than 5 $\mu$m, the end faces of the carbon layers constituting the graphite crystallite are exposed in large amounts to the surface of the carbon material. As a result, the cycle life characteristics and initial charge-discharge efficiency tend to be lowered. On the other hand, if the average particle diameter exceeds 100 $\mu$m, the reaction area of the carbon material is rendered insufficient, giving rise to the difficulty that the reaction rate of the lithium absorption-desorption reaction tends to be lowered so as to lower the discharge capacity of the secondary battery. More desirably, the average particle diameter of the carbon material should fall within a range of between 10 $\mu$m and 80 $\mu$m.

In the conventional carbon material, the polarity on the surface is small. Therefore, the immersion heat ratio $\Delta H_i^n/\Delta H_i^h$ is substantially 1 when the average particle diameter of the carbon material falls within a range of between 5 $\mu$m and 100 $\mu$m. It should be noted that the negative electrode containing a carbon material having the immersion heat ratio $\Delta H_i^n/\Delta H_i^h$ falling within a range of between 1.2 and 2 and having an average particle diameter falling within a range of between 5 $\mu$m and 100 $\mu$m permits improving the lithium absorption-desorption site of the negative electrode and also permits improving the affinity between the carbon material and the nonaqueous electrolyte. It follows that it is possible to markedly improve the discharge capacity and the cycle characteristics of the secondary battery.

It is possible for the carbon material to be spherical, fibrous, or a granular. In other words, it is possible for the negative electrode included in the secondary battery of the present invention to contain at least one kind of a carbon material selected from the group consisting of a fibrous carbon material, a spherical carbon material and a granular carbon material.

It is desirable for the average fiber length of the fibrous carbon material to fall within a range of between 5 $\mu$m and 100 $\mu$m, more desirably between 10 $\mu$m and 60 $\mu$m.

It is desirable for the average fiber diameter of the fibrous carbon material to fall within a range of between 0.1 $\mu$m and 30 $\mu$m, more desirably between 1 $\mu$m and 15 $\mu$m.

Further, it is desirable for the average aspect ratio of the fibrous carbon material to fall within a range of between 1 and 50, more desirably between 1.5 and 20. Incidentally, the term "aspect ratio" represents a ratio of the fiber length to the fiber diameter (a ratio of fiber length/fiber diameter).

It is desirable for a ratio of the minor radius to the major radius of the spherical carbonaceous material (a ratio of minor radius/major radius) to be at least 1/10, more preferably at least 1/2.

The term "granular carbonaceous material" noted above represents a carbonaceous material powder having a shape that a ratio of the minor radius to the major radius, i.e., a ratio of minor radius/major radius, falls within a range of between 1/100 and 1. More desirably, the ratio noted above should fall within a range of between 1/10 and 1.

It is desirable for the carbon material of the present invention to have an interplanar spacing $d_{002}$ derived from (002) reflection of the graphite structure obtained by the X-ray diffractometry, which falls within a range of between the theoretical value of 0.335 nm (3.35 Å) and 0.34 nm (3.4 Å). Since the particular carbon material permits suppressing the potential for the lithium absorption-desorption, it is possible to improve the energy density of the nonaqueous electrolyte secondary battery.

It is desirable for the specific surface area of the carbon material determined by the BET method to fall within a range of between 1 and 50 $m^2/g$. If the specific surface area is smaller than 1 $m^2/g$, it is possibly difficult to increase sufficiently the lithium absorption-desorption site on the surface of the carbon material. On the other hand, if the specific surface area exceeds 50 $m^2/g$, the decomposition reaction (reducing reaction) of the nonaqueous electrolyte is promoted, with the result that it is possibly difficult to obtain an excellent cycle characteristics of the secondary battery. More desirably, the specific surface area of the carbon material should fall within a range of between 2 and 20 $m^2/g$.

The carbon material having the immersion heat ratio $\Delta H_i^n / \Delta H_i^h$ defined in formula (1) can be obtained by any of the first to fifth methods of manufacturing the carbon material for a negative electrode. To be more specific, according to the first and second manufacturing methods of the carbon material for a negative electrode, it is possible to form uniformly fine pores in the surface region and the inner region of the carbon material and to introduce uniformly heterogeneous atoms such as oxygen atoms into the fine pores including those inside the carbon material. As a result, it is possible to increase the polarity on the surface of the carbon material, making it possible to obtain a carbon material having the immersion heat ratio $\Delta H_i^n / \Delta H_i^h$ defined in formula (1). Particularly, according to the fourth and fifth manufacturing methods of the carbon material for a negative electrode, it is possible to form uniformly fine pores in the surface region and the inner region of the carbon material. It is also possible to apply an acid treatment to not only the surface but also the inner region of the carbon material. As a result, it is possible to introduce uniformly at least one kind of a functional group having a high polarity selected from the group consisting of a functional group having a boron atom, a functional group having a nitrogen atom, a functional group having an oxygen atom, and a functional group having a phosphorus atom into the surface of the carbon material including the surfaces of the fine pores present inside the carbon material. It follows that it is possible to increase the polarity on the surface of the carbon material, compared with the first and second manufacturing methods of the carbon material for a negative electrode. In other words, the fourth and fifth methods of manufacturing the carbon material for a negative electrode described above make it possible to obtain a carbon material having the immersion heat ratio $\Delta H_i^n / \Delta H_i^h$ defined in formula (1) and having an average particle diameter of 5 to 100 µm.

The negative electrode can be prepared by, for example, adding a binder to the carbon material, followed by suspending the carbon material in a suitable solvent and subsequently coating a current collector with the suspension and drying and pressing the current collector coated with the suspension. It is possible to add a conducting agent to the suspension noted above.

The binder used in the present invention includes, for example, polytetrafluoroethylene (PTFE), polyvinylidene fluoride (PVdF), ethylene-propylenediene copolymer (EPDM), and styrene-butadiene rubber (SBR).

It is possible to use as a current collector a conductive substrate having a porous structure or a non-porous conductive substrate. Each of these conductive substrates can be formed of, for example, copper, stainless steel, or nickel. It is desirable for the thickness of the current collector to fall within a range of between 5 µm and 20 µm. Where the thickness of the current collector falls within the range noted above, it is possible to obtain a sufficient strength of the electrode and a sufficient lightweight of the electrode in a good balance.

It is desirable for the thickness of the active material-containing layer to fall within a range of between 10 µm and 150 µm. It follows that, where the active material-containing layer is formed on each surface of the current collector, the sum of the thicknesses of the active material-containing layers formed on both surfaces of the current collector falls within a range of between 20 µm and 300 µm. It is more desirable for the thickness of a single active material-containing layer to fall within a range of between 30 µm and 100 µm. Where the thickness falls within the range noted above, it is possible to markedly improve the large current discharge characteristics and the cycle life of the secondary battery.

2) Positive Electrode

The positive electrode comprises a positive electrode current collector and an active material-containing layer formed on one surface or each surface of the current collector.

The positive electrode can be prepared by, for example, suspending a positive electrode active material, a conducting agent and a binder in a suitable solvent, followed by coating the current collector with the resultant suspension and subsequently drying and pressing the current collector to form a band-like electrode.

It is desirable for the positive electrode active material to be formed of various oxides including, for example, manganese dioxide, lithium manganese complex oxide, lithium-containing nickel cobalt oxide (e.g., $LiCoO_2$), lithium-containing nickel cobalt oxide (e.g., $LiNi_{0.8}Co_{0.2}O_2$), and a lithium manganese complex oxide (e.g., $LiMn_2O_4$ or $LiMnO_2$). In the case of using the particular positive electrode active material, it is possible to obtain a high voltage in the secondary battery.

The conducting agent used in the present invention includes, for example, acetylene black, carbon black and graphite.

The binder used in the present invention includes, for example, polytetrafluoroethylene (PTFE), polyvinylidene fluoride (PVdF), ethylene-propylenediene copolymer (EPDM), and styrene-butadiene rubber (SBR).

Concerning the mixing ratio of the positive electrode active material, the conducting agent and the binder, it is desirable to set the amount of the positive electrode active material to fall within a range of between 80 and 95% by weight, to set the amount of the conducting agent to fall within a range of between 3 and 20% by weight, and to set the amount of the binder to fall within a range of between 2 and 7% by weight.

It is possible to use as a current collector a conductive substrate having a porous structure or a non-porous conductive substrate. Each of these conductive substrates can be formed of, for example, aluminum, stainless steel, or nickel. It is desirable for the thickness of the current collector to fall within a range of between 5 $\mu$m and 20 $\mu$m. Where the thickness of the current collector falls within the range noted above, it is possible to obtain a sufficient strength of the electrode and a sufficient lightweight of the electrode in a good balance.

It is desirable for the thickness of the active material-containing layer to fall within a range of between 10 $\mu$m and 150 $\mu$m. It follows that, where the active material-containing layer is formed on each surface of the current collector, the sum of the thicknesses of the active material-containing layers formed on both surfaces of the current collector falls within a range of between 20 $\mu$m and 300 $\mu$m. It is more desirable for the thickness of a single active material-containing layer to fall within a range of between 30 $\mu$m and 100 $\mu$m. Where the thickness falls within the range noted above, it is possible to markedly improve the large current discharge characteristics and the cycle life of the secondary battery.

3) Nonaqueous Electrolyte

The nonaqueous electrolyte used in the present invention includes a liquid nonaqueous electrolyte, a gel nonaqueous electrolyte, a polymer solid electrolyte, and an inorganic solid electrolyte having a lithium ion conductivity. Particularly, it is desirable to use a liquid nonaqueous electrolyte in the present invention.

The liquid nonaqueous electrolyte can be prepared by dissolving a solute in a nonaqueous solvent.

It is also possible to use a gel nonaqueous electrolyte, which comprises a polymer material and a liquid nonaqueous electrolyte forming a complex with the polymer material. The gel nonaqueous electrolyte can be prepared by, for example, mixing the nonaqueous solvent, the solute and the polymer material, followed by applying a heat treatment to the resultant mixture so as to permit the mixture to gel. The polymer material used in the present invention includes, for example, polyacrylonitrile, polyacrylate, polyvinylidene fluoride (PVdF), polyethylene oxide (PEO) and a copolymer containing acrylonitrile, acrylate, vinylidene fluoride or ethylene oxide as a monomer. Particularly, it is desirable to use a gel electrolyte prepared by the method described in the following. Specifically, in the first step, a solution prepared by dissolving a polymer material such as a copolymer between polyvinylidene fluoride and hexafluoropropylene in a solvent such as tetrahydroxy furan (THF) is mixed with a liquid nonaqueous electrolyte so as to obtain a paste. Then, a substrate is coated with the resultant paste, followed by drying the coating so as to obtain a thin film. An electrode group is prepared by arranging a positive electrode and a negative electrode with thin film thus obtained interposed therebetween. After the electrode group is impregnated with the liquid nonaqueous electrolyte, the thin film noted above is plasticized by a gelling treatment such as a heat treatment so as to obtain an electrode group having a gel electrolyte layer interposed between the positive electrode and the negative electrode.

The solid electrolyte can be obtained by dissolving a lithium salt in a polymer material, followed by solidifying the polymer material. The polymer material used in the present invention includes, for example, polyacrylonitrile, polyvinylidene fluoride (PVdF), polyethylene oxide (PEO), and a copolymer containing acrylonitrile, vinylidene fluoride or ethylene oxide as a monomer.

The inorganic solid electrolyte used in the present invention includes a ceramic material containing lithium. Particularly, it is desirable to use as the inorganic solid electrolyte $Li_3N$ and $Li_3PO_4$—$Li_2S$—$SiS_2$ glass.

The nonaqueous solvent and the solute contained in the nonaqueous electrolyte will now be described.

It is desirable for the nonaqueous solvent to be formed of a mixed solvent consisting of at least one kind of solvent (hereinafter referred to as a first solvent) selected from propylene carbonate (PC) and ethylene carbonate (EC) and a solvent (hereinafter referred to as a second solvent) having a viscosity lower than that of PC and EC.

The second solvent includes, for example, a chain-like carbonate such as dimethyl carbonate (DMC), methyl ethyl carbonate (MEC) or a diethyl carbonate (DEC), as well as methyl propionate, ethyl propionate, γ-butyrolactone (BL), acetonitrile (AN), ethyl acetate (EA), toluene, xylene and methyl acetate (MA). It is possible to use as the second solvent one kind of the compound selected from the group of the compounds exemplified above or a mixture of at least two kinds of these compounds. Also, it is desirable for the donor number of the second solvent not to exceed 16.5.

It is desirable for the viscosity of the second solvent to be not larger than 2.8 cmp at 25° C.

It is desirable for the first solvent to be used in the mixed solvent in an amount of 10 to 80% by volume, more preferably, in an amount of 20 to 75% by volume.

The solute used in the present invention includes, for example, lithium salts such as lithium perchlorate ($LiClO_4$), lithium hexafluoro phosphate ($LiPF_6$), lithium borofluoride ($LiBF_4$), lithium hexafluoro arsenate ($LiAsF_6$), lithium trifluoro meta-sulfonate ($LiCF_3SO_3$), and bistrifluoromethyl sulfonyl imide lithium [$LiN(CF_3SO_3)_2$]. Particularly, it is desirable to use $LiPF_6$ and $LiBF_4$ as the solute.

It is desirable for the solute to be dissolved in the nonaqueous solvent at a rate of 0.5 to 2 mol/L.

4) Separator

The separator performs the function of an insulating layer between the positive electrode and the negative electrode and is constructed such that the nonaqueous electrolyte is movable through the separator.

It is possible to use a porous body made of an insulating material for forming the separator. The insulating material used for forming the separator in the present invention includes, for example, a porous film such as a polyethylene film, a polypropylene film or a polyvinylidene fluoride film, and an unwoven fabric of a synthetic resin such as polyethylene, polypropylene or polyvinylidene fluoride. Particularly, it is desirable to use a porous film made of polyethylene, polypropylene or both polyethylene and polypropylene because the separator made of the particular porous film permits improving the safety of the secondary battery.

It is desirable for the separator to have a thickness not larger than 30 $\mu$m. If the thickness of the separator exceeds 30 $\mu$m, the distance between positive electrode and the negative electrode is rendered large so as to increase the internal resistance of the secondary battery. Also, it is desirable to set the lower limit in the thickness of the separator at 5 $\mu$m. If the thickness is smaller than 5 $\mu$m, the mechanical strength of the separator is markedly lowered. As a result, an internal short circuit tends to take place in the secondary battery. More desirably, the upper limit in the thickness of the separator should be set at 25 $\mu$m and the lower limit should be set at 10 $\mu$m.

It is desirable for the thermal shrinkage of the separator, when the separator is left to stand at 120° C. for one hour, to be not higher than 20%. If the thermal shrinkage exceeds 20%, it is highly possible for the short-circuiting to be generated by heating. More desirably, the thermal shrinkage of the separator should be not higher than 15%.

It is desirable for the separator to have a porosity falling within a range of between 30% and 70%. If the porosity is lower than 30%, it is difficult for the separator to exhibit a high capability of retaining the electrolyte. On the other hand, if the porosity exceeds 70%, it is possible for the separator to fail to exhibit a sufficiently high mechanical strength. It is more desirable for the porosity of the separator to fall within a range of between 35% and 70%.

It is desirable for the air permeability of the separator not to exceed 500 seconds/100 $cm^3$. If the air permeability exceeds 500 seconds/100 $cm^3$, it is difficult to obtain a high lithium ion mobility in the separator. On the other hand, the lower limit of the air permeability should be 30 seconds/100 $cm^3$. If the air permeability is lower than 30 seconds/100 $cm^3$, it is possibly difficult to obtain a sufficient mechanical strength of the separator. More desirably, the upper limit of the air permeability of the separator should be set at 300 seconds/100 $cm^3$, and the lower limit should be set at 50 seconds/100 $cm^3$.

6) Housing Container

The electrode group including the positive electrode and the negative electrode and the nonaqueous electrolyte are housed in the housing container.

It is possible for the housing container to be in the form of a cylinder having a bottom and circular in cross section, in the form of a cylinder having a bottom and rectangular in cross section, or in the form of a bag.

The housing container can be formed of, for example, a film material or a metal plate.

The film material used in the present invention for forming the housing container includes, for example, a metal film, a resin film made of, for example, a thermoplastic film, and a sheet including a flexible metal layer and a resin layer such as a thermoplastic resin layer formed on one surface or each surface of the metal layer. It is possible for the resin sheet and the resin layer noted above to be formed of a single kind of resin and a plurality of different kinds of resins, respectively. On the other hand, the metal layer noted above can be formed of single kind of metal or a plurality of different kinds of metals. Also, the metal film can be made of, for example, aluminum, iron, stainless steel, or nickel.

It is desirable for the film material constituting the wall of the housing container to have a thickness not larger than 0.25 mm. It is particularly desirable for the thickness of the film material to fall within a range of between 0.05 mm and 0.2 mm. In this case, it is possible to achieve a secondary battery small in thickness and light in weight.

Particularly, it is desirable to use the sheet including a flexible metal layer and a resin layer formed on one surface or each surface of the metal layer because the sheet of this type is light in weight, has a high mechanical strength, and is capable of preventing a substance such as water from entering the secondary battery from the outside. The housing container formed of the particular sheet is sealed by, for example, a heat seal. Therefore, it is desirable to arrange a thermoplastic resin layer on the inner surface of the housing container. It is desirable for the thermoplastic resin to have a melting point not lower than 120° C., more preferably a melting point falling within a range of between 140° C. and 250° C. The thermoplastic resin used in the present invention includes, for example, a polyolefin such as polyethylene or polypropylene. Particularly, it is desirable to use polypropylene having a melting point not lower than 150° C. because the sealing strength of the heat seal portion is increased. On the other hand, it is desirable for the metal layer to be made of aluminum because it is possible to prevent water from entering the secondary battery.

Figure 2:
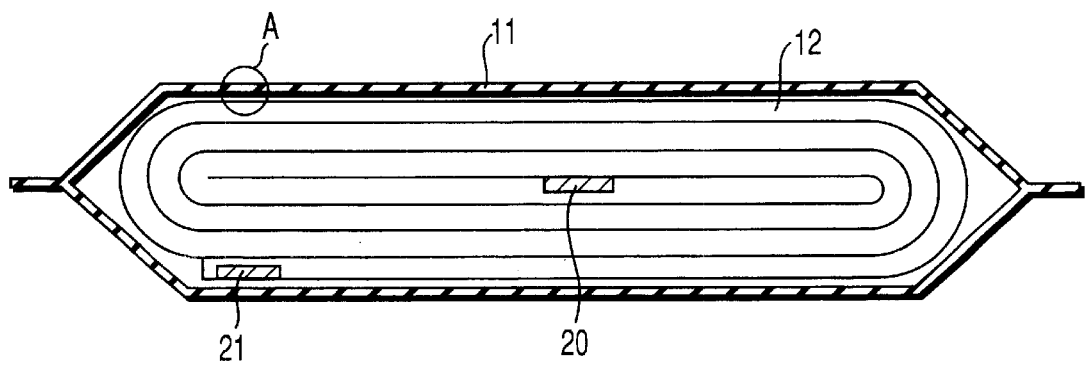
FIG. 2 is a cross sectional view showing a thin nonaqueous electrolyte secondary battery as another example of the nonaqueous electrolyte secondary battery of the present invention.
Figure 3:
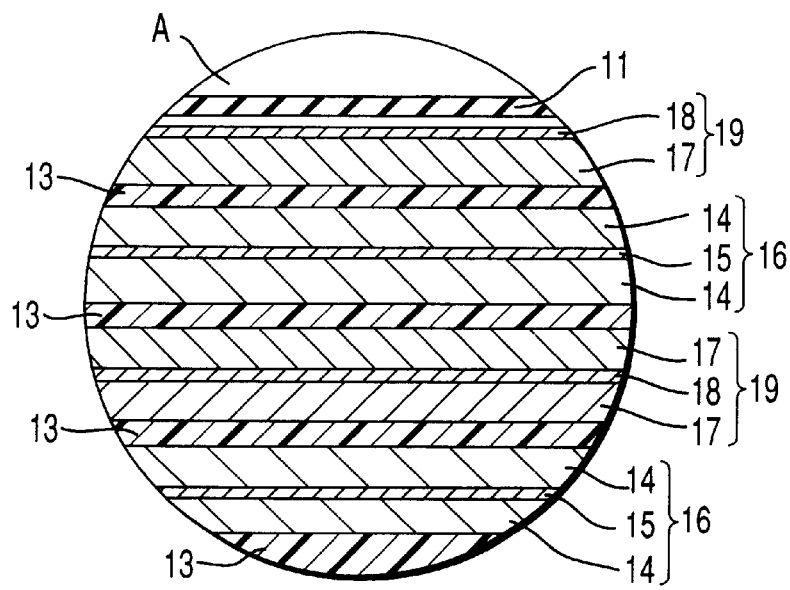
FIG. 3 is a cross sectional view showing in a magnified fashion a portion A shown in FIG. 2.

FIGS. 1 to 3 collectively show as an example the construction of a nonaqueous electrolyte secondary battery of the present invention.

Specifically, FIG. 1 is a partial cross sectional view showing a cylindrical nonaqueous electrolyte secondary battery as an example of the nonaqueous electrolyte secondary battery of the present invention. FIG. 2 is a cross sectional view showing a thin nonaqueous electrolyte secondary battery as an example of the nonaqueous electrolyte secondary battery of the present invention. Further, FIG. 3 is a cross sectional view showing in a magnified fashion portion A shown in FIG. 2.

As shown in FIG. 1, an insulator 2 is arranged in the bottom portion of a cylindrical container 1 having a bottom, circular in cross section, and made of stainless steel. An electrode group 3 is arranged within the container 1. The electrode group 3 consists of a band-like laminate structure including a positive electrode 4, a separator 5, a negative electrode 6, and a separator 5, said laminate structure being spirally wound such that the separator 5 constitutes the outermost layer of the spirally wound laminate structure.

A nonaqueous electrolyte is housed in the container 1. An insulating paper sheet 7 having a hole made in the central portion is arranged above the electrode group 3 within the container 1. An insulating sealing plate 8 is arranged in an upper open portion of the container 1, and the sealing plate 8 is fixed to the container 1 by caulking inward the region in the vicinity of the upper open portion of the container 1. A positive electrode terminal 9 is fitted into the center of the insulating sealing plate 8. One end of a positive electrode lead 10 is connected to the positive electrode 4, with the other end being connected to the positive electrode terminal 9. Further, the negative electrode 6 is connected via a negative electrode lead (not shown) to the container 1 acting as a negative electrode terminal.

As shown in FIG. 2, an electrode group 12 is housed in a housing container 11 formed of, for example, a sheet containing a resin layer. The electrode group 12 consists of a laminate structure including a positive electrode, a separator, and a negative electrode, said laminate structure wound in a flattened shape. The construction of the laminate structure is shown in detail in FIG. 3. As shown in FIG. 3, the laminate structure comprises a separator 13, a positive electrode 16 including an active material-containing layer 14, a positive electrode current collector 15, and another active material-containing layer 14, the separator 13, a negative electrode 19 including a negative electrode layer 17, a negative electrode current collector 18 and another negative electrode layer 17, the separator 13, the positive electrode 16 including the active material-containing layer 14, the positive electrode current collector 15, and the active material-containing layer 14, the separator 13, and the negative electrode 19 including the negative electrode layer 17 and the negative electrode current collector 18, which are laminated one upon the other in the order mentioned as viewed from the lowermost layer shown in the drawing. It should be noted that the negative electrode current collector 18 constitutes the outermost circumferential layer of the electrode group 12. One end of a band-like positive electrode lead 20 is connected to the positive electrode current collector 15, with the other end extending outward from the housing container 11. On the other hand, one end of a band-like negative electrode lead 21 is connected to the negative electrode current collector 18 of the electrode group 2, with the other end extending outward from the housing container 11.

As described above, the nonaqueous electrolyte secondary battery of the present invention comprises a positive electrode, a negative electrode containing a carbon material having an immersion heat ratio ($\Delta H_i^n/\Delta H_i^h$) defined by formula (1) described previously, and a nonaqueous electrolyte. The carbon material used in the present invention has fine pores distributed uniformly and a suitably high polarity on the surface. As a result, it is possible to increase the lithium absorption-desorption sites and to increase the affinity with the liquid nonaqueous electrolyte. It follows that it is possible to provide a nonaqueous electrolyte secondary battery that permits exhibiting an improved initial charge-discharge efficiency, an improved discharge capacity, and an improved charge-discharge cycle life characteristics.

It should also be noted that at least one kind of a functional group selected from the group consisting of a functional group having a boron atom, a functional group having a nitrogen atom, a functional group having an oxygen atom, and a functional group having a phosphorus atom is present on the surface region and on the surface of the pores formed inner region of the carbon material. As a result, it is possible to increase the lithium absorption-desorption sites of the carbon material. It is also possible to improve the affinity between the carbon material and the liquid nonaqueous electrolyte. It follows that it is possible to further increase the discharge capacity and the charge-discharge cycle life of the nonaqueous electrolyte secondary battery. It should be noted in particular that at least one kind of a functional group is selected from the group consisting of a carboxyl group, a carbonyl group, a hydroxyl group, a lactone group and a ketone group so as to markedly improve the charge-discharge capacity and the charge-discharge cycle life.

Examples of the present invention will now be described so as to set forth clearly the prominent effects produced by the present invention. Needless to say, the technical scope of the present invention is not limited by the Examples which follow.

EXAMPLES 1 TO 4 AND COMPARATIVE EXAMPLES 1 TO 3

Preparation of Carbon Material for Negative Electrode

A sample was prepared by spinning a petroleum pitch, followed by applying a heat treatment to the spun sample at 350° C. under the air atmosphere so as to make the spun sample infusible. Then, a treatment to graphitize the sample was performed under the heat treating temperature and the atmosphere shown in Table 1 so as to obtain a carbon material. The heat treating time was set at 8 hours. Before the heat treatment, a gas was introduced into the furnace so as to completely substitute the gas within the furnace, followed by stopping the gas supply and subsequently starting the heat treatment.

Preparation of Negative Electrode

Polytetrafluoroethylene was added to the carbon material thus obtained so as to prepare a sheet. The sheet thus prepared was pressed against a stainless steel mesh, followed by drying the sheet at 150° C. under vacuum so as to obtain a test electrode.

Assembling of Test Cell

A liquid nonaqueous electrolyte was prepared by dissolving 1M of $LiPF_6$ in a nonaqueous solvent prepared by mixing ethylene carbonate (EC) and methyl ethyl carbonate (MEC) at a mixing ratio by volume of 1:2. A cell including a counter electrode and a reference electrode each formed of metal lithium was assembled under an argon gas atmosphere by using the test electrode and the liquid nonaqueous electrolyte described above. Then, a charge-discharge test was applied to the cell thus prepared.

For the charge-discharge test, the cell was charged with a current density of 1 $mA/cm^2$ until the potential difference between the reference electrode and the test electrode was increased to reach 0.01V. Then, charging was continued for 5 hours with a constant voltage of 0.01V, followed by discharging the cell under a current density of 1 $mA/cm^2$ until the voltage was lowered to 2V. Table 1 also shows the conditions of the heat treatment and the capacity per unit weight of the negative electrode material obtained by the charge-discharge test.

TABLE 1

| | Heating temperature (° C.) | Composition of atmosphere gas | Capacity per unit weight (%) |
|---|---|---|---|
| Comparative example 1 | 3000 | Ar (100 vol. %) | 100 |
| Example 1 | 3000 | $CO_2$ (30 vol. %)/Ar (balance) | 136 |
| Example 2 | 3000 | $CO_2$ (15 vol. %)/Ar (balance) | 121 |
| Example 3 | 3000 | $H_2O$ (10 vol. %)/Ar (balance) | 129 |
| Example 4 | 3000 | $H_2O$ (5 vol. %)/Ar (balance) | 117 |
| Comparative example 2 | 3000 | $CO_2$ (5 vol. %)/Ar (balance) | 101 |
| Comparative example 3 | 3000 | $H_2O$ (0.5 vol. %)/Ar (balance) | 100 |

As apparent from Table 1, the secondary battery for each of Examples 1 to 4 comprising the negative electrode containing the carbon material obtained by the second manufacturing method was found to be superior to the secondary battery for each of Comparative Examples 1 to 3 in the negative electrode capacity per unit weight.

On the other hand, where the carbon dioxide gas concentration in the heat treating atmosphere is lower than 10% by volume as in Comparative Example 2, or where the water vapor concentration in the heat treating atmosphere is less than 1% by volume as in Comparative Example 3, it is impossible improve the capacity.

EXAMPLES 5 TO 10

Differential Thermal Analysis of Carbonaceous Material

Figure 4:
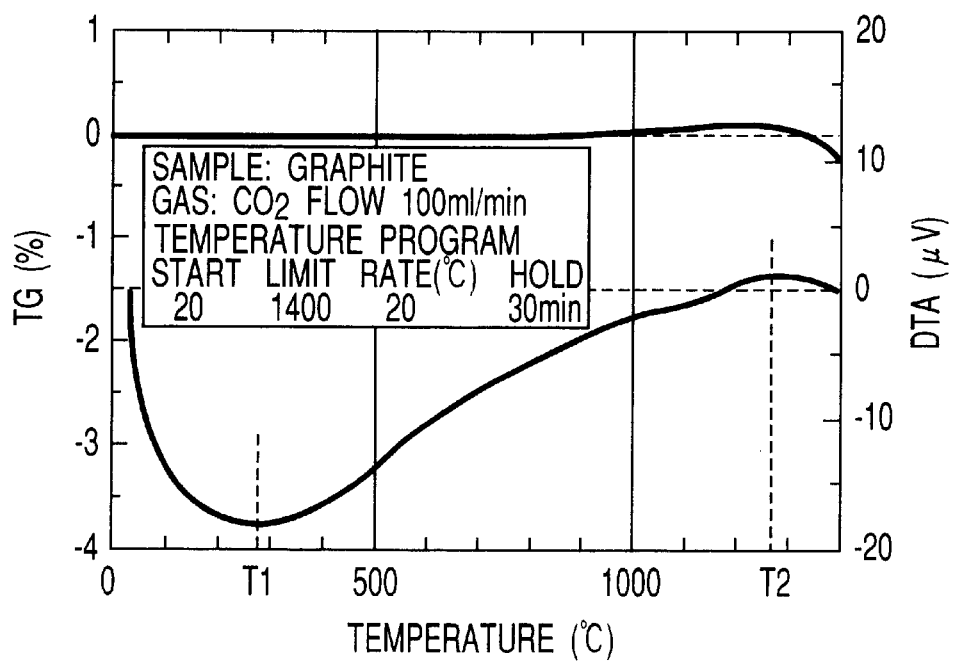
FIG. 4 is a graph exemplifying a TG curve (Y axis) and a DTA curve (R axis) obtained by a differential thermal analysis of the graphite used in Examples of the present invention.

FIG. 4 is a graph showing as an example a TG (Y axis) curve and a DTA curve (R axis) obtained by a differential thermal analysis of a highly crystalline synthetic graphite available on the market. The differential thermal analysis was performed under the conditions that 50 mg of a highly crystalline synthetic graphite available on the market was used as a sample, a carbon dioxide gas was used as an atmosphere gas within the furnace, the gas flow rate was set at 100 mL/min, the temperature at which the measurement was started was set at 20° C., the measurement was finished at 1,400° C., the temperature elevation rate was set at 20° C./min, and $\alpha\text{-}Al_2O_3$ was used as a reference substance. Peak temperature $T_1$ of the endothermic peak in the DTA curve shown in FIG. 4 is 280° C. On the other hand, peak temperature $T_2$ of the exothermic peak is 1,270° C.

Then, prepared was a highly crystalline synthetic graphite having 0.3354 nm of the interplanar spacing $d_{002}$ derived from (002) reflection, which was determined by the X-ray diffractometry, and a differential thermal analysis was applied to the highly crystalline synthetic graphite by using 4 kinds of atmospheres, i.e., gas atmospheres No. 1 to No. 4 shown in Table 2, as the atmosphere gas. Concerning the other conditions of the differential thermal analysis, the sample weight was 50 mg, the gas flow rate was 100 mL/min, the temperature elevation rate was 20° C./min, and the reference substance used was $\alpha$-$Al_2O_3$. The peak temperature $T_1$ of the endothermic peak and the peak temperature $T_2$ of the exothermic peak were obtained from the DTA curve thus obtained, and the value of $(T_1+T_2)/2$ was calculated from the values of $T_1$ and $T_2$ thus obtained. Table 2 shows the results.

TABLE 2

| Gas atmosphere | | $T_1$ (Endo-thermic peak temperature) | $T_2$ (Exo-thermic peak temperature) | $(T_1 + T_2)/2$ |
|---|---|---|---|---|
| No. 1 | $CO_2$ | 160° C. | 1235° C. | 698° C. |
| No. 2 | $CO_2$ (50 vol. %)/Ar (balance) | 177° C. | 1310° C. | 744° C. |
| No. 3 | $H_2O$ (20 vol. %)/Ar (balance) | 205° C. | 1280° C. | 743° C. |
| No. 4 | Dry air | 180° C. | 879° C. | 530° C. |

Incidentally, the term "dry air" shown in Table 2 denotes a mixed gas consisting of 80% by volume of $N_2$ gas and 20% by volume of $O_2$ gas.

Preparation of Carbon Material for Negative Electrode

Five grams of the highly crystalline synthetic graphite having 0.3354 nm of the interplanar spacing $d_{002}$ derived from (002) reflection, which was determined by the X-ray diffractometry, was put in an alumina crucible and subjected to a heat treatment for 3 hours in the presence of the atmosphere gas No. 1 shown in Table 2 and under temperatures shown in Table 3. In performing the heat treatment, the inner space of the heating furnace was evacuated to set up a vacuum state so as to prevent the air from remaining within the heating furnace and, then, a gas was introduced into the heating furnace. During the temperature elevation, during the heating and during the cooling, the gas was continued to flow at a flow rate of 0.8 L (liter)/min. Also, the temperature elevation time was set at 3 hours. After the heat treatment, the heating chamber was cooled until the sample temperature was lowered to room temperature. Then, the sample was taken out of the heating furnace so as to obtain a carbon material.

By using the carbon material thus obtained, preparation of the negative electrode, the assembling of a test cell, and the charge-discharge test were conducted as in Example 1. Table 3 also shows the results of the charge-discharge test.

COMPARATIVE EXAMPLE 4

Preparation of the negative electrode, the assembling of a test cell, and the charge-discharge test were conducted as in Example 5, except that a heat treatment was not applied to the highly crystalline synthetic graphite. Table 3 also shows the results of the charge-discharge test.

TABLE 3

| | Heat treating temperature (° C.) | Composition of atmosphere gas | Capacity per unit weight (%) |
|---|---|---|---|
| Comparative example 4 | No heat treatment | — | 100 |
| Example 5 | 1400 | Composition of No. 1 · $CO_2$ (100 vol %) | 109 |
| Example 6 | 1200 | Composition of No. 1 · $CO_2$ (100 vol %) | 121 |
| Example 7 | 1000 | Composition of No. 1 · $CO_2$ (100 vol %) | 127 |
| Example 8 | 800 | Composition of No. 1 · $CO_2$ (100 vol %) | 119 |
| Example 9 | 600 | Composition of No. 1 · $CO_2$ (100 vol %) | 107 |
| Example 10 | 400 | Composition of No. 1 · $CO_2$ (100 vol %) | 101 |

As apparent from Table 3, the secondary battery for each of Examples 5 to 10 comprising the negative electrode containing the carbon material prepared by the first manufacturing method was found to be superior in the negative electrode capacity per unit weight to the secondary battery for Comparative Example 4.

EXAMPLES 11 TO 16 AND COMPARATIVE EXAMPLES 7 TO 12

Preparation of the negative electrode, the assembling of a test cell, and the charge-discharge test were conducted as in Example 5, except that the composition of the atmosphere gas within the heating furnace and the heat treating temperature were changed as shown in Table 4 in applying a heat treatment to the highly crystalline synthetic graphite. Table 4 also shows the results of the charge-discharge test.

Incidentally, the term "dry air" shown in Table 4 denotes a mixed gas consisting of 80% by volume of $N_2$ gas and 20% by volume of $O_2$ gas.

TABLE 4

| | Heat treating temperature (° C.) | Composition of atmosphere gas | Capacity per unit weight (%) |
|---|---|---|---|
| Example 11 | 1200 | Composition of No. 2 $CO_2$ (50 vol. %)/Ar (balance) | 130 |
| Example 12 | 1000 | Composition of No. 2 $CO_2$ (50 vol. %)/Ar (balance) | 125 |
| Example 13 | 1200 | Composition of No. 3 $H_2O$ (20 vol. %)/Ar (balance) | 121 |
| Example 14 | 1000 | Composition of No. 3 $H_2O$ (20 vol. %)/Ar (balance) | 119 |
| Example 15 | 800 | Composition of No. 3 $H_2O$ (20 vol. %)/Ar (balance) | 116 |
| Example 16 | 600 | Composition of No. 3 $H_2O$ (20 vol. %)/Ar (balance) | 114 |
| Comparative example 4 | No heat treatment | — | 100 |
| Comparative example 7 | 800 | Composition of No. 4 Dry air | 108 |
| Comparative example 8 | 600 | Composition of No. 4 Dry air | 111 |
| Comparative example 9 | 500 | Composition of No. 4 Dry air | 109 |
| Comparative example 10 | 800 | $CO_2$ (5 vol. %)/Ar (balance) | 102 |
| Comparative example 11 | 1000 | $CO_2$ (5 vol. %)/Ar (balance) | 104 |
| Comparative example 12 | 1000 | $H_2O$ (0.5 vol. %)/Ar (balance) | 100 |

As apparent from Table 4, the secondary battery for each of Examples 11 to 16 comprising the negative electrode containing the carbon material prepared by the first manufacturing method was found to be superior in the negative electrode capacity per unit weight to the secondary battery for each of Comparative Examples 4 and 7 to 12.

As apparent from Tables 1 to 4, the carbon material processed by the manufacturing method of the present invention permits markedly improving the electrode capacity. It should be noted that the highly crystalline synthetic graphite to which the heat treatment was applied under a gas flow containing $CO_2$ or $H_2O$ exhibited an increase in the capacity superior to the effect produced by the heat treatment performed under the air atmosphere. Also, in the case of performing the graphitizing treatment under an atmosphere containing $CO_2$ or $H_2O$, it is possible to obtain a capacity larger than that obtained in the case of applying a graphitizing treatment under an argon gas atmosphere. It should be noted that the effect of increasing the capacity was scarcely recognized in each of the Comparative Examples in which the $CO_2$ concentration in the heating atmosphere was set at 5% by volume or the $H_2O$ concentration in the heating atmosphere was set at 0.5% by volume.

EXAMPLES 17 TO 20 AND COMPARATIVE EXAMPLES 13 TO 14

Five grams of the highly crystalline synthetic graphite having 0.3354 nm of the interplanar spacing $d_{002}$ derived from (002) reflection, which was determined by the X-ray diffractometry, was put in an alumina crucible and subjected to a heat treatment. In performing the heat treatment, the inner space of the heating furnace was evacuated to set up a vacuum state so as to prevent the air from remaining within the heating furnace and, then, an atmosphere gas was introduced into the heating furnace. The atmosphere gas introduced into the heating furnace was prepared by passing an argon gas through a boiling aqueous solution of an acid so as to permit the argon gas to contain the vapor of the acid. Table 5 shows the kinds of the acids used and the concentrations (% by weight) of the aqueous solutions of the acids. The gas was allowed to flow through the heating furnace at a flow rate of 0.4 L/min during the temperature elevation and during the heating. Also, the heat treating temperature was set as shown in Table 5. The temperature elevation time was set at one hour, and the holding time was set at 30 minutes. After the heat treatment, the heating chamber was cooled until the sample temperature was lowered to room temperature. Then, the sample was taken out of the heating furnace so as to obtain a carbon material.

By using the carbon material thus obtained, preparation of the negative electrode, the assembling of a test cell, and the charge-discharge test were conducted as in Example 1. Table 5 also shows the results of the charge-discharge test.

TABLE 5

| | Kind of acid used | Concentration of acid aqueous solution (wt %) | Heat treating temperature (° C.) | Capacity per unit weight (%) |
|---|---|---|---|---|
| Example 17 | Nitric acid | 68 | 450 | 124 |
| Example 18 | Hydrochloric acid | 37 | 450 | 112 |
| Example 19 | Sulfuric acid | 96 | 450 | 115 |
| Example 20 | Acetic acid | 98 | 450 | 118 |
| Comparative example 13 | None | — | None | 100 |
| Comparative example 14 | None | — | 450 | 101 |

As apparent from Table 5, the capacity can be markedly improved by applying a heat treatment to the carbon material in the presence of an acid vapor. The effect is particularly large in the case of using a 68% aqueous solution of nitric acid as the acid.

EXAMPLES 21 TO 23

A heat treatment was applied to a highly crystalline synthetic graphite having 0.3354 nm of an interplanar spacing $d_{002}$ derived from (002) reflection, which was determined by the X-ray diffractometry, under the conditions similar to those employed in Example 11. To reiterate, the heat treatment was performed under a heat treating temperature of 1,200° C. by using as the atmosphere gas a mixed gas consisting of 50% by volume of a carbon dioxide gas and 50% by volume of an argon gas. Then, an after-heat treatment was applied to the highly crystalline synthetic graphite under the conditions similar to those employed in Example 17. Specifically, the after-heat treatment was performed at a heating temperature of 450° C. by using a 68% aqueous solution of nitric acid so as to obtain a carbon material for Example 21.

Similarly, a heat treatment was applied to a highly crystalline synthetic graphite having 0.3354 nm of an interplanar spacing $d_{002}$ derived from (002) reflection, which was determined by the x-ray diffractometry, under the conditions similar to those employed in Example 17. To reiterate, the heat treatment was performed by using a 68% aqueous solution of nitric acid under a heat treating temperature of 450° C. Then, an after-heat treatment was applied to the highly crystalline synthetic graphite under the conditions similar to those employed in Example 11. Specifically, the after-heat treatment was performed at a heating temperature of 1,200° C. by using a mixed gas consisting of 50% by volume of a carbon dioxide gas and 50% by volume of an argon gas, so as to obtain a carbon material for Example 22.

Further, a heat treatment was applied to a highly crystalline synthetic graphite having 0.3354 nm of an interplanar spacing $d_{002}$ derived from (002) reflection, which was determined by the X-ray diffractometry, under the conditions similar to those employed in Example 17. To reiterate, the heat treatment was performed by using a 68% aqueous solution of nitric acid under a heat treating temperature of 450° C. Then, an after-heat treatment was applied to the highly crystalline synthetic graphite under the conditions similar to those employed in Example 13. Specifically, the after-heat treatment was performed at a heating temperature of 1,200° C. by using a mixed gas consisting of 20% by volume of water vapor and 80% by volume of an argon gas, so as to obtain a carbon material for Example 23.

By using the three kinds of the carbon materials thus obtained, preparation of the negative electrode, the assembling of a test cell, and the charge-discharge test were conducted as in Example 1. Table 6 also shows the results of the charge-discharge test. It should be noted that the capacity per unit weight shown in Table 6 is a relative value, with the capacity per unit weight for the test cell of Comparative Example 4 set at 100(%). In Table 6, the heat treatment performed first is indicated as "First Stage Heat Treatment (I)", and the heat treatment performed later is indicated as "Second Stage Heat Treatment (II)".

TABLE 6

|  | First stage heat treatment (I) | Second stage heat treatment (II) | Capacity (%) per unit weight |
|---|---|---|---|
| Example 21 | CO$_2$ (Example 11) | Nitric acid (Example 17) | 146 |
| Example 22 | Nitric acid (Example 17) | CO$_2$ (Example 11) | 132 |
| Example 23 | Nitric acid (Example 17) | H$_2$O (Example 13) | 133 |

As apparent from Table 6, it was possible to obtain a secondary battery having a high capacity in each of Examples 21, 22 in which both the heat treatment under an atmosphere containing at least 10% by volume of a carbon dioxide gas and the heat treatment under an atmosphere containing an acid vapor were applied to the highly crystalline synthetic graphite and Example 23 in which both the heat treatment under an atmosphere containing at least 1% by volume of a water vapor and the heat treatment under an atmosphere containing an acid vapor were applied to the highly crystalline synthetic graphite. Particularly, the capacity was markedly improved in the secondary battery for Example 21, in which the heat treatment under an atmosphere containing an acid vapor was applied after the heat treatment performed under an atmosphere containing at least 10% by volume of a carbon dioxide gas.

EXAMPLES 24 TO 27

5 grams of a graphitized carbon fiber available on the market, which had an average fiber length of 40 μm and an average particle diameter shown in Table 8, was put in an alumina crucible and subjected to a heat treatment for 3 hours under the temperatures shown in Table 7 in the presence of the atmosphere gas having the composition shown in Table 7. In performing the heat treatment, the inner space of the heating furnace was evacuated to set up a vacuum state so as to prevent the air from remaining within the heating furnace and, then, an atmosphere gas was introduced into the heating furnace. During the temperature elevation, during the heating and during the cooling, a gas was allowed to flow at a flow rate of 0.8 L/min. Also, the temperature elevation time was set at 3 hours. After the heat treatment, the heating chamber was cooled until the sample temperature was lowered to room temperature. Then, the sample was taken out of the heating furnace so as to obtain a fibrous carbon material.

The average particle diameter, the interplanar spacing d$_{002}$ derived from (002) reflection, which was determined by the X-ray diffractometry, and the specific surface area, which was determined by the BET method, was measured in respect of the carbon material thus obtained. Table 8 shows the results. Incidentally, for measuring the specific surface area of the carbon material determined by the BET method, used was a mixed gas of He—N$_2$ (70:30), and the specific surface area was measured by a one-point type BET method. Also, the average particle diameter was measured by a microtrac particle analyzer manufactured by Leeds & Northrup Corp., the granulometer having a type number of 9320-X100. To be more specific, the carbon material particles are suspended in a dispersion medium of ethyl alcohol. The suspended carbon material particles are irradiated with a laser light, and the intensity distribution of the scattering light is measured. The intensity distribution thus measured is converted into the particle size distribution by a computer analysis. The accumulated average diameter (accumulated 50% diameter) in the particle size distribution thus obtained is indicated in Table 8 as the average particle diameter.

Further, the immersion heat $\Delta H_i^h$ for n-heptane and the immersion heat $\Delta H_i^n$ for 1-nitropropane were measured in respect of the carbon material thus obtained by using a Calvet type heat conduction calorimeter manufactured by Tokyo Riko Inc., the calorimeter having a type number MMC-5111.

To be more specific, a solvent is poured into a sample vessel. Also, a sample is put in a glass ampoule and, then, the glass ampoule is subjected to a vacuum deaeration, followed by heat-sealing the glass ampoule. After the ampoule is immersed in the solvent within the sample vessel, the sample vessel is set in the twin type heat transmission calorimeter. After an equilibrium temperature is reached, the ampoule is broken and the solvent is stirred so as to mix the sample with the solvent. Further, the amount of heat generated is measured.

Within the twin type heat transmission calorimeter, the sample vessel is connected to a homeothermal body via a heat conductive electric conductor that also acts as a heat sensitive body. It is possible to determine the heat generation amount and a rate of change by measuring the change with time in the temperature difference between both edges of the heat sensitive body.

The measuring conditions were as follows:

Amount of sample (carbon material): 1.2 g;

Pretreatment of sample: 150° C., 10 mm Hg to 5 mm Hg, 6 hours;

Measuring temperature: 25° C.;

Immersion medium: n-hexane or 1-nitropropane;

Amount of immersion medium: 22 mL;

Heat amount calculation: data processing by computer;

The immersion heat ratio $\Delta H_i^n / \Delta H_i^h$ was calculated from the values of $\Delta H_i^n$ and $\Delta H_i^h$ thus obtained. Table 8 also shows the results.

EXAMPLE 28

5 grams of a graphitized carbon fiber available on the market, which had an average fiber length of 40 μm and an average particle diameter of 25 μm, was put in an alumina crucible and subjected to a heat treatment for 3 hours at 1,000° C. in the presence of an atmosphere gas consisting of 100% by volume of a carbon dioxide gas. In performing the heat treatment, the inner space of the heating furnace was evacuated to set up a vacuum state so as to prevent the air from remaining within the heating furnace and, then, an atmosphere gas was introduced into the heating furnace. During the temperature elevation, during the heating and during the cooling, a gas was allowed to flow at a flow rate of 0.8 L/min. Also, the temperature elevation time was set at 3 hours. After the heat treatment, the heating chamber was cooled until the sample temperature was lowered to room temperature. Then, the sample was taken out of the heating furnace so as to obtain a fibrous carbon material.

Then, a heat treatment was applied again to the fibrous carbon material thus prepared. The atmosphere gas introduced into the heating furnace was prepared by passing an argon gas through a boiling aqueous solution containing 68% by weight of nitric acid so as to allow the argon gas to contain a nitric acid vapor. During the temperature elevation and during the heating, the gas was circulated at a flow rate of 0.4 L/min. Also, the heat treating temperature was set at 450° C. and the heat treating time was set at 3 hours. Further, the temperature elevation time was set at one hour and the holding time was set at 30 minutes. After the heat treatment, the heating chamber was cooled until the sample temperature was lowered to room temperature. Then, the sample was taken out of the heating furnace so as to obtain a carbon material.

The average particle diameter, the interplanar spacing $d_{002}$ derived from (002) reflection, which was determined by the X-ray diffractometry, the specific surface area determined by the BET method, and the immersion heat ratio $\Delta H_i^n / \Delta H_i^h$ were measured under the conditions equal to those employed in Example 24 in respect of the carbon material thus obtained. Table 8 shows the results.

EXAMPLE 29

A carbon material was obtained as in Example 28, except that an aqueous solution containing 98% by weight of acetic acid was used as the acid aqueous solution forming a gaseous acid.

The average particle diameter, the interplanar spacing $d_{002}$ derived from (002) reflection, which was determined by the X-ray diffractometry, the specific surface area determined by the BET method, and the immersion heat ratio $\Delta H_i^n / \Delta H_i^h$ of the carbon material were measured under the conditions equal to those employed in Example 24 in respect of the carbon material thus obtained. Table 8 shows the results.

EXAMPLE 30

A carbon material was obtained as in Example 28, except that an aqueous solution containing 85% by weight of phosphoric acid was used as the acid aqueous solution forming a gaseous acid.

The average particle diameter, the interplanar spacing $d_{002}$ derived from (002) reflection, which was determined by the X-ray diffractometry, the specific surface area determined by the BET method, and the immersion heat ratio $\Delta H_i^n / \Delta H_i^h$ of the carbon material were measured under the conditions equal to those employed in Example 24 in respect of the carbon material thus obtained. Table 8 shows the results.

EXAMPLE 31

A sample was prepared by spinning a petroleum pitch used as a carbon precursor, followed by applying a heat treatment to the spun sample at 300° C. for one hour so as to make the spun sample infusible. Then, a heat treatment was applied to the carbon precursor at 900° C. for 3 hours in the presence of an atmosphere gas consisting of 100% by volume of a carbon dioxide gas so as to obtain a carbonized material. The carbonized material thus obtained belonged to an amorphous carbon or a soft carbon. Further, a heat treatment was applied to the carbonized material at 2800° C. for 3 hours in the presence of an atmosphere gas consisting of 100% by volume of a carbon dioxide gas so as to obtain a fibrous carbon material. Before the heat treatment, an atmosphere gas was introduced into the furnace so as to completely substitute the gas within the furnace, followed by stopping the gas supply and subsequently starting the heat treatment.

The average particle diameter, the interplanar spacing $d_{002}$ derived from (002) reflection, which was determined by the X-ray diffractometry, the specific surface area determined by the BET method, and the immersion heat ratio $\Delta H_i^n / \Delta H_i^h$ of the carbon material were measured under the conditions equal to those employed in Example 24 in respect of the carbon material thus obtained. Table 8 shows the results.

EXAMPLE 32

A sample was prepared by spinning a petroleum pitch used as a carbon precursor, followed by applying a heat treatment to the spun sample at 300° C. for one hour so as to make the spun sample infusible. Then, a heat treatment was applied to the carbon precursor at 900° C. for 3 hours in the presence of an atmosphere gas consisting of 20% by volume of $H_2O$ gas and 80% by volume of $CO_2$ gas so as to obtain a carbonized material. The carbonized material thus obtained belonged to an amorphous carbon or a soft carbon. Further, a heat treatment was applied to the carbonized material at 2800° C. for 3 hours in the presence of an atmosphere gas consisting of 20% by volume of $H_2O$ gas and 80% by volume of $CO_2$ gas so as to obtain a fibrous carbon material. Before the heat treatment, an atmosphere gas was introduced into the furnace so as to completely substitute the gas within the furnace, followed by stopping the gas supply and subsequently starting the heat treatment.

Then, a heat treatment was applied to the fibrous carbon material. The atmosphere gas introduced into the heating furnace was prepared by introducing an argon gas into a boiling aqueous solution containing 68% by weight of nitric acid so as to allow the argon gas to contain a vapor of nitric acid. During the temperature elevation and during the heating, the gas was circulated at a flow rate of 0.4 L/min. The heat treating temperature was set at 450° C., and the heat treating time was set at 3 hours. Also, the temperature elevation time was set at one hour, and the holding time was set at 30 minutes. After the heat treatment, the heating chamber was cooled until the sample temperature was lowered to room temperature. Then, the sample was taken out of the heating furnace so as to obtain a carbon material.

The average particle diameter, the interplanar spacing $d_{002}$ derived from (002) reflection, which was determined by the X-ray diffractometry, the specific surface area determined by the BET method, and the immersion heat ratio $\Delta H_i^n / \Delta H_i^h$ of the carbon material were measured under the conditions equal to those employed in Example 24 in respect of the carbon material thus obtained. Table 8 shows the results.

COMPARATIVE EXAMPLES 15 TO 23

Carbon materials for Comparative Examples 16 to 23 were obtained by applying a heat treatment at the temperatures shown in Table 7 for 3 hours to the graphitized carbon fiber available on the market, the carbon fiber having an average fiber length of 40 μm and an average particle diameter shown in Table 8, in the presence of the atmosphere gas whose compositions are also shown in Table 7. Also, a graphitized carbon fiber to which a heat treatment was not applied at all was also prepared as a carbon material for Comparative Example 15. Incidentally, a mixed gas consisting of 80% by volume of a $N_2$ gas and 20% by volume of an $O_2$ gas was used as the heat treating atmosphere for each of Comparative Examples 16 and 17.

The average particle diameter, the interplanar spacing $d_{002}$ derived from (002) reflection, which was determined by the X-ray diffractometry, the specific surface area determined by the BET method, and the immersion heat ratio $\Delta H_i^n / \Delta H_i^h$ of the carbon material were measured under the conditions equal to those employed in Example 24 in respect of the carbon material thus obtained. Table 8 shows the results.

A test cell was assembled by using the carbon material obtained in each of Examples 24 to 32 and Comparative Examples 15 to 23 by the method described below.

In the first step, polytetrafluoroethylene was added to each of the carbon materials thus obtained so as to prepare a sheet. The sheet thus prepared was pressed against a stainless steel mesh, followed by drying the sheet at 150° C. under vacuum so as to obtain a test electrode. Also, a liquid nonaqueous electrolyte was prepared by dissolving 1M of $LiPF_6$ in a nonaqueous solvent prepared by mixing ethylene carbonate (EC) and methyl ethyl carbonate (MEC) at a mixing ratio by volume of 1:2. A test cell including a counter electrode and a reference electrode each formed of metal lithium was assembled under an argon gas atmosphere by using the test electrode and the liquid nonaqueous electrolyte described above.

A charge-discharge test was conducted under conditions (1) and (2) given below in respect of the test cell for each of the Examples 24 to 32 and Comparative Examples 15 to 23. Table 8 also shows the results.

(1) The test cell was charged with a current density of 1 $mA/cm^2$ until the potential difference between the reference electrode and the test electrode was increased to reach 0.01V. Then, charging was continued for 5 hours with a constant voltage of 0.01V, followed by discharging the test cell under a current density of 1 $mA/cm^2$ until the voltage was lowered to 2V so as to measure the discharge capacity. Table 8 also shows the discharge capacity per gram of the carbon material for the negative electrode.

(2) The charge-discharge was repeated under the conditions given below so as to measure the number of charge-discharge cycles required for the discharge capacity to be lowered to 80% of the capacity for the first charge-discharge cycle. Table 8 also shows the results.

Charge: The test cell was charged with a current density of 1 $mA/cm^2$ until the potential difference between the reference electrode and the test electrode was increased to reach 0.01V. Then, charging was continued for 5 hours with a constant voltage of 0.01V.

Discharge: The test cell was discharged under a current density of 1 $mA/cm^2$ until the voltage was lowered to 2V.

TABLE 7

| | Heat treating conditions | | | Acid treating conditions | | |
|---|---|---|---|---|---|---|
| | Atmosphere | Temperature (° C.) | Time | Acid | Temperature (° C.) | Time |
| Example 24 | $CO_2$ | 700 | 3h | — | — | — |
| Example 25 | $CO_2$ | 900 | 3h | — | — | — |
| Example 26 | $CO_2$ | 1000 | 3h | — | — | — |
| Example 27 | $H_2O$(20 vol. %)/Ar (balance) | 1000 1000 | 3h | — | — | — |
| Example 28 | $CO_2$ | 1000 | 3h | Nitric acid | 450 | 3h |
| Example 29 | $CO_2$ | 1000 | 3h | Acetic acid | 450 | 3h |
| Example 30 | $CO_2$ | 1000 | 3h | Phosphoric acid | 450 | 3h |
| Example 31 | $CO_2$ | 2800 | 3h | — | — | — |
| Example 32 | $H_2O$(20 vol. %)/$CO_2$ (balance) | 2800 | 3h | Nitric acid | 450 | 3h |
| Comparative example 15 | — | — | — | — | — | — |
| Comparative example 16 | Air | 700 | 3h | — | — | — |
| Comparative example 17 | Air | 600 | 3h | — | — | — |
| Comparative example 18 | Ar | 1000 | 3h | — | — | — |
| Comparative example 19 | $N_2$ | 1000 | 3h | — | — | — |
| Comparative example 20 | $CO_2$ | 500 | 3h | — | — | — |
| Comparative example 21 | Ozone | 200 | 3h | — | — | — |
| Comparative example 22 | $NO_2$ | 450 | 3h | — | — | — |
| Comparative example 23 | $SO_3$ | 500 | 3h | — | — | — |

TABLE 8

| | Carbon material | | | | | |
|---|---|---|---|---|---|---|
| | Average particle diameter ($\mu$m) | Immersion heat ratio ($\Delta H_i^n/\Delta H_i^h$) | Interplanar spacing $d_{002}$ (nm) | Specific surface area ($m^2/g$) | Battery capacity (mAh/g) | Cycle life |
| Example 24 | 25 | 1.2 | 0.3357 | 1.56 | 338 | 72 |
| Example 25 | 24 | 1.28 | 0.3357 | 2.85 | 343 | 68 |
| Example 26 | 23 | 1.25 | 0.3357 | 4.36 | 347 | 66 |
| Example 27 | 24 | 1.48 | 0.3356 | 5.22 | 346 | 62 |
| Example 28 | 25 | 1.61 | 0.3354 | 4.40 | 381 | 68 |
| Example 29 | 26 | 2 | 0.3359 | 4.74 | 376 | 56 |
| Example 30 | 26 | 1.58 | 0.3357 | 4.43 | 370 | 60 |

TABLE 8-continued

| | Carbon material | | | | | |
|---|---|---|---|---|---|---|
| | Average particle diameter ($\mu$m) | Immersion heat ratio ($\Delta H_i^n/\Delta H_i^h$) | Interplanar spacing $d_{002}$ (nm) | Specific surface area (m$^2$/g) | Battery capacity (mAh/g) | Cycle life |
| Example 31 | 22 | 1.52 | 0.3354 | 10.6 | 365 | 58 |
| Example 32 | 23 | 1.65 | 0.3357 | 10.3 | 358 | 55 |
| Comparative example 15 | 23 | 1.05 | 0.3354 | 0.48 | 310 | 62 |
| Comparative example 16 | 24 | 1.01 | 0.3355 | 3.43 | 315 | 56 |
| Comparative example 17 | 25 | 1 | 0.3357 | 1.23 | 314 | 70 |
| Comparative example 18 | 24 | 1.02 | 0.3358 | 0.86 | 318 | 64 |
| Comparative example 19 | 25 | 1.1 | 0.3355 | 0.65 | 322 | 63 |
| Comparative example 20 | 25 | 2.5 | 0.3354 | 0.49 | 328 | 60 |
| Comparative example 21 | 26 | 2.6 | 0.3357 | 3.86 | 336 | 34 |
| Comparative example 22 | 24 | 2.5 | 0.3355 | 4.21 | 333 | 48 |
| Comparative example 23 | 23 | 2.8 | 0.3358 | 4.02 | 329 | 21 |

As apparent from Tables 7 and 8, the secondary battery for each of Examples 24 to 32 comprising a negative electrode containing a carbon material having the immersion heat ratio $\Delta H_i^n/\Delta H_i^h$ defined in formula (1) described previously has a high discharge capacity and exhibits a long cycle life.

On the other hand, the secondary battery for each of Comparative Examples 16 to 18 comprising a negative electrode containing a carbon material to which a heat treatment was applied under the air atmosphere or an argon gas atmosphere is substantially equal in the immersion heat ratio $\Delta H_i^n/\Delta H_i^h$ to the secondary battery for Comparative Example 15 comprising a negative electrode containing a carbon material to which a heat treatment was not applied and is inferior in the discharge capacity and the cycle life to the secondary battery for each of Examples 24 to 32. It is also seen that the secondary battery for each of Comparative Examples 19 to 23 is inferior in the cycle life to the secondary battery for each of Examples 24 to 32.

As described above in detail, the present invention provides a carbon material for a negative electrode capable of improving the initial charge-discharge efficiency, the discharge capacity, the large current discharge characteristics and the cycle life of a nonaqueous electrolyte secondary battery. The present invention also provides a nonaqueous electrolyte secondary battery capable of improving the initial charge-discharge efficiency, the discharge capacity, the large current discharge characteristics and the cycle life of the nonaqueous electrolyte secondary battery.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A nonaqueous electrolyte secondary battery, comprising:
   a positive electrode;
   a negative electrode containing a graphitized material having an immersion heat ratio ($\Delta H_i^n/\Delta H_i^h$) defined by formula (1); and
   a nonaqueous electrolyte:

$$1.2 \leq \Delta H_i^n/\Delta H_i^h \leq 2 \quad (1)$$

where $\Delta H_i^h$ denotes the immersion heat for n-heptane of the graphitized material, and $\Delta H_i^n$ denotes the immersion heat for 1-nitropropane of the graphitized material.

2. The nonaqueous electrolyte secondary battery according to claim 1, wherein said graphitized material is prepared by subjecting a carbonaceous material containing at least one material selected from the group consisting of a carbonized material and a second graphitized material to a heat treatment under a gaseous atmosphere selected from the group consisting of a first gaseous atmosphere containing at least 10% by volume of $CO_2$, a second gaseous atmosphere containing at least 1% by volume of $H_2O$, and a third gaseous atmosphere containing at least 10% by volume of $CO_2$ and at least 1% by volume of $H_2O$.

3. The nonaqueous electrolyte secondary battery according to claim 1, wherein said graphitized material is prepared by subjecting a carbonaceous material containing at least one material selected from the group consisting of a carbonized material and a second graphitized material to a heat treatment under a gaseous atmosphere selected from the group consisting of a first gaseous atmosphere containing at least 10% by volume of $CO_2$, a second gaseous atmosphere containing at least 1% by volume of $H_2O$, and a third gaseous atmosphere containing at least 10% by volume of $CO_2$ and at least 1% by volume of $H_2O$, followed by applying an additional heat treatment to said carbonaceous material under an atmosphere containing at least one vapor selected from the group consisting of an inorganic acid vapor and an organic acid vapor.

4. The nonaqueous electrolyte secondary battery according to claim 1, wherein said immersion heat ratio ($\Delta H_i^n/\Delta H_i^h$) falls within a range of between 1.25 and 1.75.

5. The nonaqueous electrolyte secondary battery according to claim 1, wherein said graphitized material has an average particle diameter falling within a range of between 5 $\mu$m and 100 $\mu$m.

6. The nonaqueous electrolyte secondary battery according to claim 5, wherein said graphitized material has a specific surface area determined by BET method, which falls within a range of between 1 m$^2$/g and 50 m$^2$/g.

7. The nonaqueous electrolyte secondary battery according to claim 1, wherein said graphitized material has an interplanar spacing $d_{002}$ derived from (002) reflection, which is determined by an X-ray diffractometry, falling within a range of between 0.335 nm and 0.34 nm.

8. The nonaqueous electrolyte secondary battery according to claim 1, wherein said nonaqueous electrolyte is any one of nonaqueous electrolytes selected from the group consisting of a liquid nonaqueous electrolyte, a gel nonaqueous electrolyte and a solid nonaqueous electrolyte.

9. A graphitized material for a negative electrode, having an immersion heat ratio ($\Delta H_i^n/\Delta H_i^h$) defined by formula (1):

$$1.2 \leq \Delta H_i^n/\Delta H_i^h \leq 2 \tag{1}$$

where $\Delta H_i^h$ denotes the immersion heat for n-heptane of the graphitized material, and $\Delta H_i^n$ denotes the immersion heat for 1-nitropropane of the carbon graphitized material.

10. The graphitized material for a negative electrode according to claim 9, wherein said graphitized material is prepared by subjecting a carbonaceous material containing at least one material selected from the group consisting of a carbonized material and a second graphitized material to a heat treatment under a gaseous atmosphere selected from the group consisting of a first gaseous atmosphere containing at least 10% by volume of $CO_2$, a second gaseous atmosphere containing at least 1% by volume of $H_2O$, and a third gaseous atmosphere containing at least 10% by volume of $CO_2$ and at least 1% by volume of $H_2O$, followed by applying an additional heat treatment to said carbonaceous material under an atmosphere containing at least one vapor selected from the group consisting of an inorganic acid vapor and an organic acid vapor.

11. The graphitized material for a negative electrode according to claim 9, wherein said immersion heat ratio $\Delta H_i^n/\Delta H_i^h$ falls within a range of between 1.25 and 1.75.

12. The nonaqueous electrolyte secondary battery according to claim 1, wherein the graphitized material has a specific surface area determined by BET method, which falls within a range of 2 $m^2/g$ to 20 $m^2/g$.

* * * * *